(12) United States Patent
Fuchs

(10) Patent No.: US 11,633,667 B2
(45) Date of Patent: Apr. 25, 2023

(54) AUGMENTED REALITY SYSTEM AND METHOD OF OPERATION THEREOF

(71) Applicant: Matthew Daniel Fuchs, Los Gatos, CA (US)

(72) Inventor: Matthew Daniel Fuchs, Los Gatos, CA (US)

(73) Assignee: Matthew Daniel Fuchs, Las Gatos, CA (US)

( * ) Notice: Subject to any disclaimer, the term of this patent is extended or adjusted under 35 U.S.C. 154(b) by 0 days.

(21) Appl. No.: 17/903,941

(22) Filed: Sep. 6, 2022

(65) Prior Publication Data

US 2023/0001294 A1 Jan. 5, 2023

Related U.S. Application Data

(63) Continuation of application No. 17/353,676, filed on Jun. 21, 2021, now Pat. No. 11,433,297, which is a continuation of application No. 16/459,358, filed on Jul. 1, 2019, now Pat. No. 11,040,276, which is a
(Continued)

(51) Int. Cl.
| | |
|---|---|
| *A63F 13/26* | (2014.01) |
| *G06F 3/01* | (2006.01) |
| *G06T 19/00* | (2011.01) |
| *A63F 13/211* | (2014.01) |
| *A63F 13/216* | (2014.01) |
| *A63F 13/213* | (2014.01) |
| *A63F 13/69* | (2014.01) |
| *A63F 13/73* | (2014.01) |

(52) U.S. Cl.
CPC ............ *A63F 13/26* (2014.09); *A63F 13/211* (2014.09); *A63F 13/213* (2014.09); *A63F 13/216* (2014.09); *A63F 13/69* (2014.09); *A63F 13/73* (2014.09); *G06F 3/011* (2013.01); *G06F 3/012* (2013.01); *G06T 19/006* (2013.01)

(58) Field of Classification Search
None
See application file for complete search history.

(56) References Cited

U.S. PATENT DOCUMENTS

| | | | | |
|---|---|---|---|---|
| 5,873,096 | A * | 2/1999 | Lim | G06F 16/27 |
| | | | | 707/999.005 |
| 6,446,089 | B1 * | 9/2002 | Brodersen | G06F 16/278 |

(Continued)

OTHER PUBLICATIONS

Chinese Patent Office, Application No. 2015800767891, Office Action dated Apr. 3, 2020.
(Continued)

*Primary Examiner* — Jason A Pringle-Parker
(74) *Attorney, Agent, or Firm* — Shield Intellectual Property PC

(57) ABSTRACT

A system and method of operation of an augmented reality system includes: a position sensor (140) for calculating a current location (144); an orientation sensor (142), coupled to the position sensor (140), for calculating a current orientation (146); and a control mechanism (118), coupled to the position sensor (140), for presenting a system object (126) based on the current location (144), the current orientation (146), an object location (128), an object orientation (130), an access right (120), a visibility (134), and a persistence (136).

20 Claims, 14 Drawing Sheets

Related U.S. Application Data continuation of application No. 14/965,006, filed on Dec. 10, 2015, now Pat. No. 10,335,677.

(60) Provisional application No. 62/096,109, filed on Dec. 23, 2014.

(56) References Cited

U.S. PATENT DOCUMENTS

| | | | |
|---|---|---|---|
| 6,509,902 B1 * | 1/2003 | Pfister | G06T 5/20 345/582 |
| 8,386,619 B2 | 2/2013 | Mallet et al. | |
| 10,360,363 B1 | 7/2019 | Grosberg | |
| 2002/0145623 A1 * | 10/2002 | Decombe | G06F 3/0481 715/734 |
| 2003/0004916 A1 | 1/2003 | Lewis | |
| 2004/0179104 A1 | 9/2004 | Benton | |
| 2004/0179107 A1 | 9/2004 | Benton | |
| 2008/0225048 A1 * | 9/2008 | Bijankumar | G06T 15/40 345/421 |
| 2010/0191728 A1 | 7/2010 | Reilly et al. | |
| 2010/0208033 A1 | 8/2010 | Edge et al. | |
| 2011/0055756 A1 * | 3/2011 | Chen | G06F 3/0482 715/810 |
| 2011/0208817 A1 | 8/2011 | Toledano et al. | |
| 2011/0279453 A1 | 11/2011 | Murphy et al. | |
| 2012/0019858 A1 | 1/2012 | Sato | |
| 2012/0129605 A1 | 5/2012 | Livet et al. | |
| 2012/0249591 A1 | 10/2012 | Maciocci et al. | |
| 2014/0002496 A1 | 1/2014 | Lamb et al. | |
| 2014/0204077 A1 | 7/2014 | Kamuda et al. | |
| 2014/0215389 A1 | 7/2014 | Walsh et al. | |
| 2014/0354685 A1 | 12/2014 | Lazarow et al. | |
| 2014/0359085 A1 | 12/2014 | Chen | |
| 2015/0317831 A1 | 11/2015 | Ebstyne et al. | |
| 2016/0180602 A1 | 6/2016 | Fuchs | |
| 2019/0321723 A1 | 10/2019 | Fuchs | |
| 2021/0308568 A1 | 10/2021 | Fuchs | |

OTHER PUBLICATIONS

European Patent Office, Application No. 15874147.0, Extended European Search Report dated Nov. 21, 2017.

European Patent Office, Application No. 15874147.0, Foreign Office Action dated Apr. 23, 2020.

European Patent Office, Application No. 15874147.0, Foreign Office Action dated Dec. 10, 2021.

Leal-Melendrez et al., "Occlusion Handling In Video-Based Augmented Reality Using The Kinect Sensor For Indoor Registration", 2013.

U.S. Appl. No. 14/965,006, Non-Final Office Action dated Aug. 7, 2018.

U.S. Appl. No. 14/965,006, Notice of Allowance dated Feb. 14, 2019.

U.S. Appl. No. 16/459,358, Final Office Action dated Feb. 14, 2020.

U.S. Appl. No. 16/459,358, Non-Final Office Action dated Jul. 30, 2019.

U.S. Appl. No. 16/459,358, Non-Final Office Action dated Jul. 8, 2020.

U.S. Appl. No. 16/459,358, Notice of Allowance dated Feb. 18, 2021.

U.S. Appl. No. 17/353,676, Notice of Allowance dated Apr. 29, 2022.

World Intellectual Property Organization, Application No. PCT/US2015/066188, International Search Report dated Mar. 3, 2016.

* cited by examiner

AUGMENTED REALITY SYSTEM AND METHOD OF OPERATION THEREOF

CROSS-REFERENCE TO RELATED APPLICATION(S)

This application claims priority as a Continuation of U.S. application Ser. No. 17/353,676, filed Jun. 21, 2021, which claims priority as Continuation of U.S. application Ser. No. 16/459,358, filed Jul. 1, 2019, now U.S. Pat. No. 11,040,276 issued on Jun. 22, 2021, which claims priority as a Continuation of U.S. application Ser. No. 14/965,006, filed Dec. 10, 2015, now U.S. Pat. No. 10,335,677 issued on Jul. 2, 2019, which claims priority to U.S. Provisional Patent Application Ser. No. 62/096,109 filed Dec. 23, 2014, the entire contents of which are incorporated by reference as if fully set forth herein, under 35 U.S.C. § 120. The applicants hereby rescind any disclaimer of claim scope in the parent applications or the prosecution history thereof and advise the USPTO that the claims in this application may be broader than any claim in the parent application(s).

TECHNICAL FIELD

The present invention relates generally to an augmented reality system, and more particularly to an augmented reality system with visibility and persistence control.

BACKGROUND ART

The development of modern Internet systems allows display of information related to specific content. Web pages can be configured to include hyperlinks to contextual content anywhere in the world. Clicking on contextual links can present the user with related information including graphics, video, audio, image, 3-dimensional (3D) information, or a combination thereof.

Such contextual information can be displayed on a wide variety of devices including computer monitors, projectors, smart glasses, tablet computers, smart phones, and 3-dimensional displays. In the case of virtual reality systems, information can be linked to locations and displayed in a representation of a 3D virtual synthetic world.

Presenting information in a contextual way can increase the effectiveness of the information by associating the information with locations, times, people, and things. Displaying information in the appropriate context can increase the value and usability of the contextual information.

In view of the need for the effective use of information due to the increase in Internet traffic, it is increasingly critical that answers be found to these problems. In view of the ever-increasing commercial competitive pressures, along with growing expectations of the populace, it is critical that answers be found for these problems. Additionally, the need to reduce costs, improve efficiencies and performance, and meet critical time pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of an augmented reality system that includes: detecting a current location; detecting a current orientation; detecting a system object having an object location within a detection threshold of the current location; retrieving a content associated with the system object; calculating a persistence of the system object based on the current time and a persistence extent; calculating a visibility of the system object based on an access right and the object location; and presenting the content of the system object to a control mechanism based on the persistence and the visibility.

The present invention provides an augmented reality system that includes: a position sensor for calculating a current location; an orientation sensor, coupled to the position sensor, for calculating a current orientation; and a control mechanism, coupled to the position sensor, for presenting a system object based on the current location, the current orientation, an object location, an object orientation, an access right, a visibility, and a persistence.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
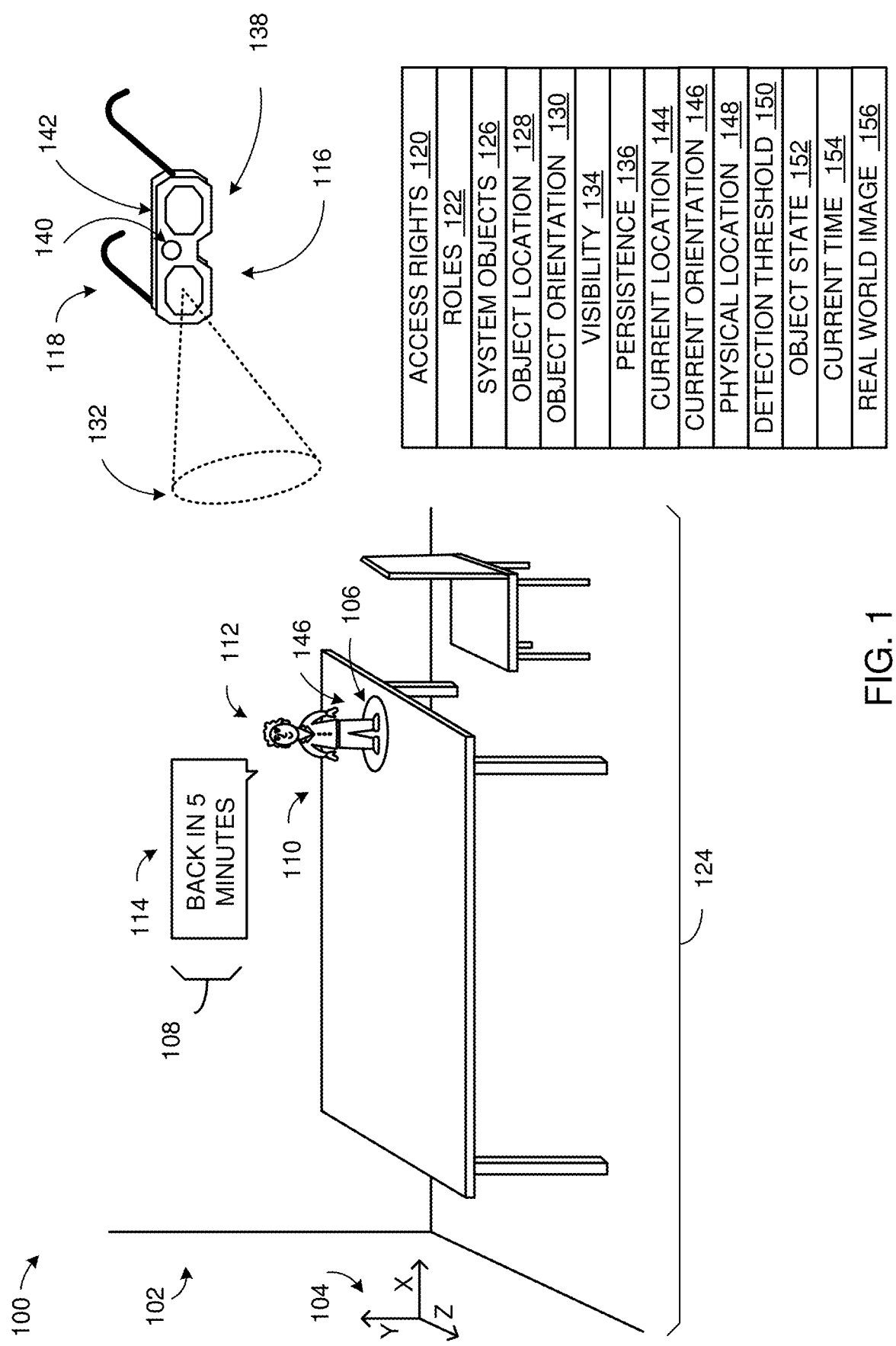
FIG. 1 is an exemplary diagram of an augmented reality system in a first embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGS. is arbitrary for the most part. Generally, the invention can be operated in any orientation.

Where multiple embodiments are disclosed and described having some features in common, for clarity and ease of illustration, description, and comprehension thereof, similar and like features will be described with the same or similar reference numerals.

For expository purposes, the term "horizontal" as used herein is defined as a plane parallel to the plane or surface of the surface of the earth, regardless of its orientation. The term "vertical" refers to a direction perpendicular to the horizontal as just defined. Terms, such as "above", "below", "bottom", "top", "side", "higher", "lower", "upper", "over", and "under", are defined with respect to the horizontal plane, as shown in the figures.

Referring now to FIG. 1, therein is shown an exemplary diagram of an augmented reality system 100 in a first embodiment of the present invention. The augmented reality system 100 can manage and present information associated with a current location 144 in the real world.

The augmented reality system 100 can access and show information related to system objects 126 that can represent elements in the real world. For example, the augmented reality system 100 can overlay information about the system objects 126 over a real world image 156. The real world image 156 is a picture of the current scene from the perspective of the user. Information associated with the current location 144 can be displayed by the augmented reality system 100 when the user looks at the current location 144 in the real world.

The current location 144 is a physical position in the real world. The current location 144 can be determined in a variety of ways. For example, the current location 144 can be the center of the user's head, the geometric center of the user, a focal plane based users perception, a coordinate, or a combination thereof. The current location 144 can be refined based on the information associated with points or objects around the current location 144. The current location 144 can describe the position of the user, an arbitrary location, a target location, a destination location, a known location, or a combination thereof. The current location can be calculated by a device, entered manually, received from an external source, or a combination thereof.

The system objects 126 can include frames of reference 102, points of interest 106, items 110, roles 122, and other similar entities. The augmented reality system 100 can be described using one or more of the frames of reference 102, each specifying a frame geometry 104 for positioning the points of interest 106 (POI) which are attached to the items 110 that contain or are linked to a content 108.

The frames of reference 102 are systems for defining locations. For example, the frames of reference 102 can include coordinate-based systems, object based systems, relative location systems, or a combination thereof.

The points of interest 106 are identifiers for locations. Each of the points of interest 106 can be associated with a physical location 148. The points of interest 106 can be a logical or physical location. The physical location 148 can be a geographical coordinate, a relative location, a location based on a beacon, a room in a building, a portion of an object, or a combination thereof. The logical location may be a phrase in the text of a book. For example, the logical location can be a bookmark with notes associated with a certain page.

The items 110 are logical representations of objects in one of the frames of reference 102. For example, the items 110 are data that can represent content, messages, structures, or other entities in the augmented reality system 100. The items 110 can be representations or data that can be operated upon by the augmented reality system 100. The items 110 can be data that the hardware of the augmented reality system 100 can represent or use to receive other content. In general, the frame geometry 104 describes the physical space, the points of interest 106 designate particular parts of that space, and the items 110 can attach content to those particular locations. The frame geometry 104 can be used to represent and recognize chairs, tables, and other physical objects. However, one of the points of interest 106 can designate a particular chair, table, or portion of a chair. The items 110 could then be assigned to that one of the points of interest 106. The points of interest 106 are the links between the physical and the virtual worlds.

The roles 122 are sets of properties of the system objects 126. For example, the roles 122 can be used to describe security categories, operational groups, identifiers, or a combination thereof. The roles 122 can be used to control access to the system object 126.

The augmented reality system 100 can support the management and linking of the system objects 126 with the real world based on two important properties. Each of the system objects 126 can have the properties of visibility 134 and persistence 136.

The visibility 134 indicates whether one of the system objects 126 can be perceived. The system objects 126 can be perceived by one of the agents 116 and shown to one of the users. The visibility 134 can be determined on an object by object basis and can depend on the location, rights, security, and other properties of the system objects 126.

The visibility 134 can control who can interact with the system objects 126. Each of the agents 116 interacting with virtual content can perceive some of the same objects at the same place but in different ways. For example, a general text message, such as a menu, may appear to different users in different languages at the same location. Alternatively, a private message for another person should only be visible to the intended person. The message can be invisible to everyone else. In another example, only players of a treasure hunt games should be able to perceive the game content and then perhaps only if they've solved the appropriate prior clues.

The augmented reality system 100 can manage the lifecycle of the system objects 126 over time. Each of the system objects 126 can have the property of persistence 136. The persistence 136 is an existence descriptor. The persistence 136 describes where the system objects 126 are and how long they will be in a particular location. The persistence 136 can be calculated to determine if the system objects 126 exist at a current time 154. The current time 154 is the time and date either in the local area or a universal time format. Although the persistence 136 is described as a property, it is understood that the persistence 136 can be represented by a data structure having multiple values including hierarchical values.

The persistence 136 can describe the location of the system objects 126 and their duration at a particular location. For example, if a virtual object is placed on a wall, then it should still be there when the user returns later. The virtual object should be there in the same spot when another of the agents 116 with appropriate permissions arrives to view it. The virtual object should persist in the augmented world even if any local application or equipment even changes.

The persistence 136 of the system objects 126 can have different characteristics. For example, the system objects 126 can be configured to only be available on Wednesdays. Another of the system objects 126 can be configured to only be available for a defined period of time. The persistence 136 can be continuous, intermittent, data dependent, condition dependent, location dependent, or a combination thereof.

The persistence 136 of the system objects 126 can control how the system objects 126 are shared among users. The description of the virtual object and its position must be available over the network to any user. The properties of the virtual object can be stored in the network so it is no longer dependent on a local system or server. Because of the need to manage a large number of the agents 116 interacting in real time with multiple services responding to agent changes, such as movement, and object changes should occur within a few hundred milliseconds.

The frames of reference 102 are the coordinate systems for representing locations. The frames of reference 102 can be implemented in a variety of ways. For example, the augmented reality system 100 can use the frames of reference 102 based on geographical coordinates, relative coordinates, structural contexts, or a combination thereof. In another example, the frames of reference 102 can include the surface of the earth, the rooms of a building, the pages of a book, the surface of a picture, or a relative location based on a signal from a beacon. The frames of reference 102 can be temporally based including points in time, such as those related to a blog post on a particular day.

The frame geometry 104 can specify how to identify a point in one of the frames of reference 102. For example, the frame geometry 104 can be global positioning system (GPS) coordinates, a connectivity graph of a building, sensory data, location data relative to a beacon, orientation information, Simultaneous Location and Mapping (SLAM) point clouds, or a combination thereof.

The points of interest 106 specify a particular region according to the frame geometry 104 in one of the frames of reference 102. The points of interest 106 can represent not just a single point, but can also describe a three dimensional volume, a two-dimensional surface, or a time-varying entity such as an object in motion. The points of interest 106 can have a precise location that may require real-time computation to calculate.

The points of interest 106 can include additional location information, such as computer vision data. For example, one of the points of interest 106 can be the "Starry Night" painting on a particular wall of the Museum of Modern Art in New York City. The visual information can help locate the exact position and orientation of the painting in a particular room because other location technologies may be deprecated inside the building. The points of interest 106 can include additional location information to support a sensor fusion approach to determine the exact location in difficult conditions by combining multiple inputs such as GPS, magnetometer, cameras, or other similar inputs.

The items 110 are objects that can have the content 108 associated with them. The items 110 can represent information attached to the points of interest 106. For example, the one of the items 110 can be a message, information, a note, or similar data.

The points of interest 106 can cover the physical word, while the items 110 can be logical objects associated with one of the points of interest 106. There can be a plurality of the items 110 associated with a single one of the points of interest 106. In an illustrative example, the upper lip of the Mona Lisa painting can be one of the points of interest 106 and a user can associated one of the items 110, such as a moustache, with the upper lip.

The content 108 is information that can be associated with the items 110. The content 108 can be text, audio, graphics, images, video, 3D content, relationships, behavior, actions, properties, or a combination thereof. The content 108 can be retrieved based on the items 110.

The augmented reality system 100 can include the agents 116. The agents 116 are devices for interacting with the augmented reality system 100. For example, the agents 116 can be a computational device with a set of sensors and displays that can change position in the physical world and one or more of the frames of reference 102. The agents 116 can also include a communication unit to link to the network and interact with the augmented reality system 100 and the physical world.

The agents 116 can display information directly to human users. However, the agents 116 can also provide information for other automated system such as other ones of the agents 116 or other computer systems. The agents 116 can also change their own behavior based on the information perceived.

The agents 116 can also present information directly to other agents 116 or external systems. The agents 116 can exchange information with the external systems and initiate actions in the physical world. For example, based on information from the augmented reality system 100, the agents 116 can activate an alarm system, close valves, change the lighting levels, control the temperature of an air conditioning system, interface with an ecommerce system to change prices on products, control turnstiles, or similar activities.

Although the augmented reality system 100 is described as displaying information, it is understood that displaying information includes transferring data to other system to perform actions. The act of displaying the information involves using the information for a variety of purposes including controlling display devices, controlling other systems, performing actions, or a combination thereof.

The agents 116 can be associated to the points of interest 106. Groups of the agents 116 can be co-located with one another based on the co-location of the points of interest 106.

The augmented reality system 100 can support a system of access rights 120. The access rights 120 can define the permissions and allowable actions for the system objects 126. The system objects 126 can include the frames of reference 102, the points of interest 106, the items 110, and other entities in the system. The access rights 120 can include access to the visibility 134 property, but there can be an arbitrarily large number of the access rights 120. For example, the access rights 120 can include the right to create one of the points of interest 106 in one of the frames of reference 102 or to attach one of the items 110 to one of the points of interest 106.

The access rights 120 can be configured in a variety of ways. For example, the access rights 120 can be organized into sets known as the roles 122. Different ones of the access rights 120 can appear in different ones of the roles 122.

In an illustrative example, one of the frames of reference 102 can designate a room in a building. The frame geometry 104 can be represented by a three-dimensional coordinate reference. The augmented reality system 100 can represent the physical layout of the room, including the coordinates of the items 110 such as tables and chairs.

The user of the augmented reality system 100 can leave a message 114 for a friend by associating the content 108 with one of the points of interest 106 on a table. The message 114 can be assigned the access rights 120 to be visible only to another person who has the access rights 120 to perceive the message 114. One of the items 110 containing the content 108 expressing the message and can be assigned the access rights 120 to be visible.

The augmented reality system 100 can also display an avatar 112 with the message 114. The avatar 112 is a display element that can indicate the owner or originator of the message 114. The avatar 112 can be represented by a human figure, a stick figure, a sign, an animated figure, a graphic, or other similar element.

The message 114 can be displayed using a viewing unit 118. The viewing unit 118 is a device for viewing the system objects 126 and the content 108 in the augmented reality system 100. The viewing unit 118, such as smart glasses, a tablet computer, a smart phone, an e-reader, or other similar viewing device, can show the message as part of a scene 124 or can display the message 114 by itself.

Although the viewing unit 118 unit is described as a device for displaying information, it is understood that the viewing device 118 can perform other actions. The augmented reality system 100 can present the information about the system objects 126 to the viewing unit 118 to perform an action. The terms viewing and displaying are abstractions of the general terminology for performing the action. The action can include displaying the information, performing an activity based on the information, controlling another system based on the information being presented, or a combination thereof. The viewing unit 118 can be a display unit, an actuator, a control mechanism, or a combination thereof. The control mechanism is a device for controlling another system, device, mechanism, computer, controller, or other external system. For example, the control mechanism can be a controller for an electronic system.

The agents 116 can include the viewing unit 118 to display the message 114. For example, the agents 116 can be implemented as software (not shown) running on the viewing unit 118. The viewing unit 118 can have the current location 144. The current location 144 is the physical location of the viewing unit 118.

Each of the agents 116 can be associated with a set of the roles 122. Via the roles 122, each of the agents 116 can be associated with a particular set of the access rights 120. The access rights 120 associated with each of the agents 116 control which of the content 108 can be displayed by the viewing unit 118 of the agents 116.

Each of the agents 116 can be associated with one or more of the frames of reference 102. Thus, the combination of the points of interest 106, one of the frames of reference 102, and the roles 122 associated with one of the agents 116 can determine which of the content 108 can be displayed for one of the agents 116.

For example, one of the agents 116 can enter or leave one of the frames of reference 102 representing a building by physically entering or leaving the associated building in the real world. Each of the agents 116 can include an object location 128 and an object orientation 130 for the current one of the frames of reference 102.

The object location 128 and the object orientation 130 can be based on the frame geometry 104 of the current one of the frames of reference 102. The object location 128 and the object orientation 130 can determine which of the points of interest 106 are in a field of view 132 for an agent. The field of view 132 for the agents 116 can be used to determine the visibility 134 of the system objects 126 relative to one of the agents 116 near the current one of the points of interest 106. Further the object location 128 and the object orientation 130 can determine which of the system objects 126 can interact with one of the agents 116.

The augmented reality system 100 can convey the object location 128 and an object state 152 to the agents 116. When the agents 116 receive the information about the object location 128, the object orientation 130, and an object state 152, the agents 116 can determine what actions can take place. The object state 152 are the properties of one of the system objects 126. The object state 152 can vary over time.

For example, the agents 116 can receive enough information to identify where one of the items 110 is located in the current one of the frame of reference 102. The information can include the location of the item, a thumbnail image of the item, other state information about the item, a universal resource locator (URL) linking the item to a source of data, or a combination thereof.

The augmented reality system 100 can be configured to dynamically load information about the items 110 by loading the information about the points of interest 106 near the object location 128. The information can include the content 108, the message 114, or other information tagged with the object location 128 of the points of interest 106.

Once the agents 116 are aware of the items 110, the augmented reality system 100 can allow the agents 116 to communication directly with an external data system having information about the items 110. The URL of the external data system can be associated with the items 110. Alternatively, the information associated the items 110 can include code, such as JavaScript, or other routines to perform information transfers. The external data system can also provide additional information to render and display the system objects 126.

The augmented reality system 100 can display the system objects 126 via the viewing unit 118 based on the current location 144 and a current orientation 146 provided by sensors 138 associated with the viewing unit 118. The current location 144 and the current orientation 146 can determine the visibility 134 of the system objects 126 in the augmented reality system 100. The visibility 134 can also indicate the right to be aware of one of the system objects 126 that may not be in the direct line of sight.

The viewing unit 118 can include a variety of sensors. For example, the sensors 138 can include a position sensor 140, an orientation sensor 142, GPS unit, a camera, an imaging system, accelerometers, cell tower triangulation systems, or a combination thereof.

The position sensor 140 is a device to determine the current location 144 of the user using the viewing unit 118. For example, the position sensor 140 can be a GPS unit, a cell tower triangulation system, WiFi-based position sensors, an optical location system, or a similar location system. The current location 144 can be determined using a sensor fusion approach by combining several sensor inputs to refine the location. The position sensor 140 can also be the combination of several sensory subsystems to determine the current location 144 to the accuracy required by the augmented reality system 100. The accuracy required can be a system or user level parameters that can be adjusted as necessary. Although the position sensor 140 is described as a sensory device, it is understood that the position sensor 140 can support the direct entry of a location by users or other external systems. Thus, the current location 144 can be arbitrarily selected by the user by entering a location value into the position sensor 140, directly calculated by the position sensor 140, received from an external source, or a combination thereof. Detecting the current location 144 can include calculating, entering, receiving, or other actions for acquiring the current location 144.

The orientation sensor 142 is a sensor to determine the current orientation 146 of the user while viewing the scene. For example, the orientation sensor 142 can be an accelerometer, a mechanical orientation system, or a similar system. Although the orientation sensor 142 is described as a sensory device, it is understood that the orientation sensor 142 can support the direct entry of the orientation information. Thus, the current orientation 146 can be directly selected by the user by entering an orientation value into the orientation sensor 142, calculated by the orientation sensor 142, received from an external source, or a combination thereof. Detecting the current orientation 146 can include calculating, entering, receiving, or other actions for acquiring the current orientation 146.

The viewing unit 118 can continuously update the current location 144 and the current orientation 146 of the user. The current location 144 and the current orientation 146 of the viewing unit 118 can determine which of the points of interest 106 are nearby. Nearby is when the points of interest 106 are within a detection threshold 150 of the current location 144. The detection threshold 150 is the distance where one of the points of interest 106 can be used. The detection threshold 150 can be different for each user. The detection threshold 150 can be based on the characteristics of one of the frames of reference 102.

The augmented reality system 100 can download information to the agents 116 to optimize bandwidth using a variety of techniques. For example, each of the system objects 126 can have an awareness radius in which it is active. Information about the system objects 126 that are beyond the radius can be downloaded, but they are only displayed when they are within the awareness radius.

The ubiquity of wireless internet devices brings the ability to fuse the virtual world with the real world. Augmented reality can imbue any object or point in space with virtual content to provide a richer informational experience. On the Internet, content and links are available in in a web browser environment. This allows a user to read a page and follow links to related content. However, in normal circumstances, the user is limited to the computer screen and the web browser.

In the augmented reality system 100, content and links are tied to the physical world as expressed by the representations of people, buildings, cars, monsters, books, restaurant reviews, etc. Interaction is controlled by the physical proximity of real world objects and their augmented reality representations and enhancements. While normal web content can be accessed by entering or clicking on a defined link presented on a web page, the augmented world content can be enabled by moving and interacting with the physical world. The augmented reality world provides an analogous system to let you find and use the content physically surrounding you. In the augmented reality system 100 any object or location in the real world can be configured with a hyperlink to the content 108 or other actions.

It has been discovered that the augmented reality system 100 improves the seamlessness of the display of information by limiting the visibility 134 and the persistence 136 of the system objects 126. Reducing the amount of information presented to the user makes the user more efficient and makes the experience more natural.

The augmented reality system 100 can allow any point in space or any object to be made into a link at any time by any user of the system. Users can be walking through a fog of links and services without knowing. The augmented reality system 100 can provide a shared experience where users can have their own view into this huge shared augmented reality.

The augmented reality system 100 can perform computations, display media, show messages, support interactions between users, perform transactions, and other operations on a mobile computational device, such as the viewing unit 118, that is triggered by the interaction of the device with the physical world around it based on sensor data, either alone or in conjunction with other networked devices. Although augmented reality can be thought of as the display of virtual content on a smartphone, tablet computer, e-reader, or smart glasses keyed off some real world object, such as a picture or Quick Response (QR) code, the augmented reality system 100 shows that it is not limited to showing pictures to people. The augmented reality system 100 supports the collaborative actions between devices moving about the real world, the creation and lifecycle management of virtual objects, and interacting between the real world and the augmented world, with content display as one important type of interaction, but not the only one.

The implementation of the augmented reality system 100 requires the interoperation of a variety of technologies. The augmented reality system 100 is an integration of systems such as the computational cloud, servers, computer vision systems, three-dimensional graphics systems, Global Positioning Systems (GPS), wireless networking, etc. to provide a global space that can be shared by the users of the augmented reality system 100.

It has been discovered that displaying the system objects 126 based on the persistence 136 can improve performance by reducing system overhead. Tagging each of the system objects 126 with the persistence 136 if the system objects 126 are active at the current time 154 simplifies the detection of the system objects 126.

Figure 2:
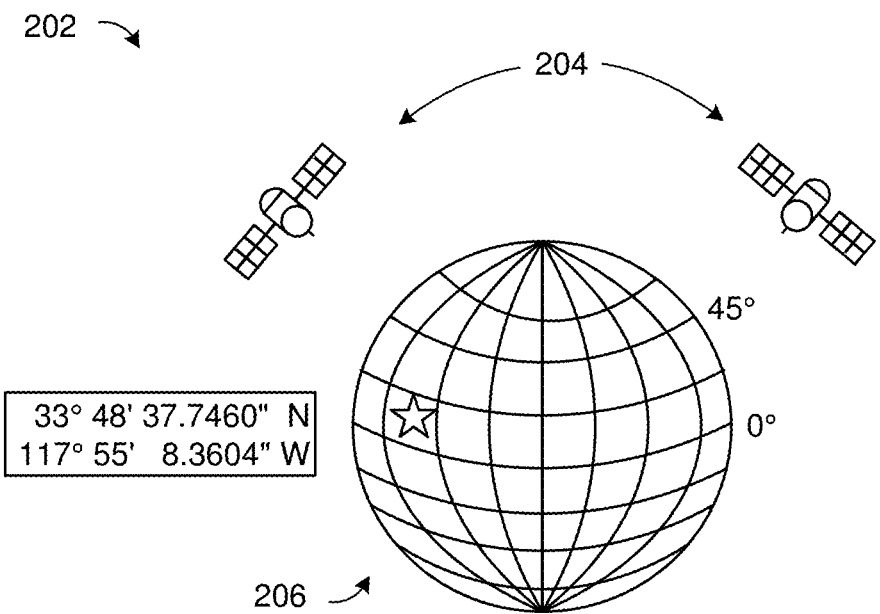
FIG. 2 is an example of a global coordinate system.

Referring now to FIG. 2, therein is shown an example of a global coordinate system 202. One of the frames of reference 102 of FIG. 1 can use the global coordinate system 202 to represent locations. For example, the global coordinate system 202 can be a GPS system providing latitude and longitude coordinates to designate locations on the globe.

The GPS system can include GPS satellites 204 that can facilitate the reception of the GPS signals around a globe 206 to determine the location of structures in the augmented reality system 100 of FIG. 1. A set of the coordinates can define the location of the points of interest 106 of FIG. 1, the items 110 of FIG. 1, the frames of reference 102, or other objects in the augmented reality system 100.

Figure 3:
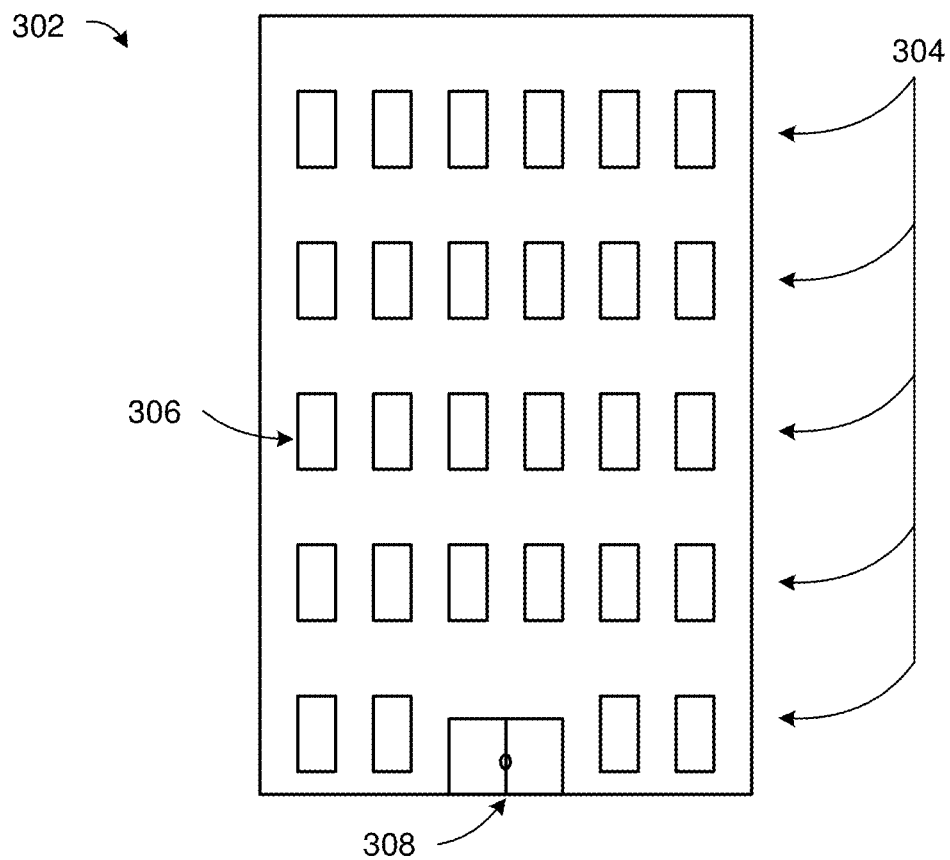
FIG. 3 is an example of a building coordinate system.

Referring now to FIG. 3, therein is shown an example of a building coordinate system 302. The building coordinate system 302 can represent the locations based on the structure of the building. The building coordinate system 302 can identify a location based on a floor 304 and a room 306. For example, the object location 128 of FIG. 1 of one of the points of interest 106 of FIG. 1 could be defined as room 2 on floor 3 of the building. Thus, one of the frames of reference 102 of FIG. 1 can use the building coordinate system 302 to indicate the locations within the augmented reality system 100 of FIG. 1. An entry point 308 can be used to enter the building coordinate system 302 from the global coordinate system 202 of FIG. 2.

Figure 4:
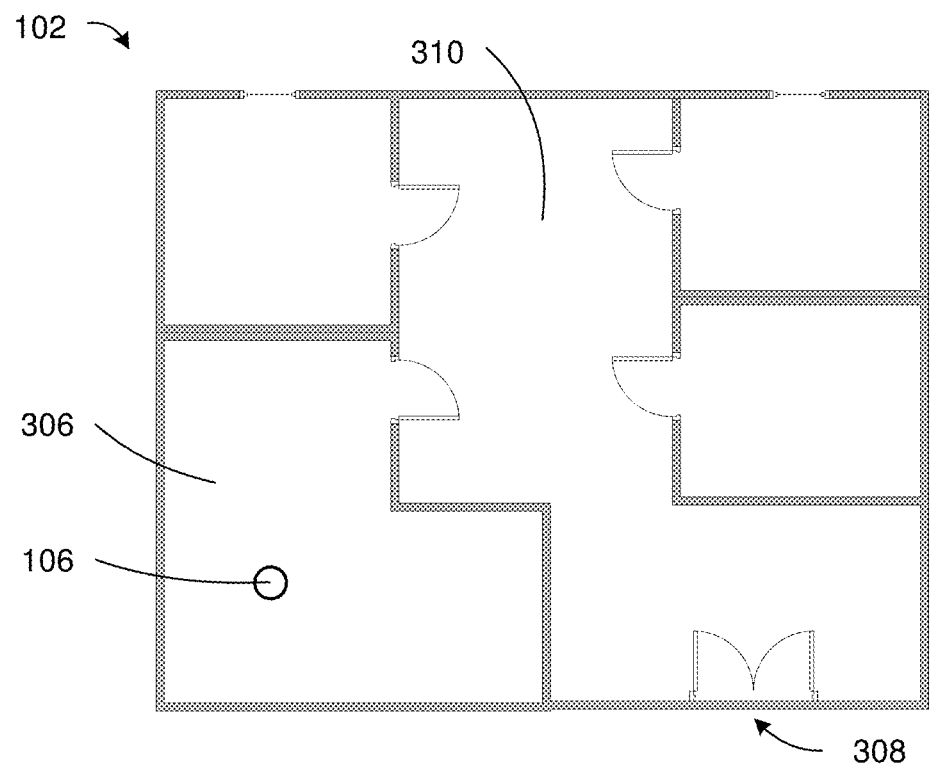
FIG. 4 is an example of one of the frames of reference using the building coordinate system.

Referring now to FIG. 4, therein is shown an example of one of the frames of reference using the building coordinate system 302 of FIG. 3. One of the points of interest 106 can be in one of the rooms in the building. One of the frames of reference 102 can use the building coordinate system 302 in a hierarchical configuration to represent locations.

The building coordinate system 302 for one of the frames of reference 102 can include the entry point 308, the room 306, and a hallway 310. For example, one of the frames of reference 102 can indicate that one of the points of interest 106 is in room 2 on the third floor of the building.

The building coordinate system 302 can be configured in a variety of ways. For example, the building coordinate system 302 can represent locations using the floor number and a detailed description of the rooms and corridors on each of the floors. Each of the rooms and corridors can be uniquely identified in the building coordinate system 302.

The entry point 308 can represent the interface between two of the frames of reference 102. For example, one of the agents 116 of FIG. 1 can navigate to the building in the global coordinate system 202 of FIG. 2 and then enter the building at the entry point 308. After entering the building, the building coordinate system 302 can be used.

Figure 5:
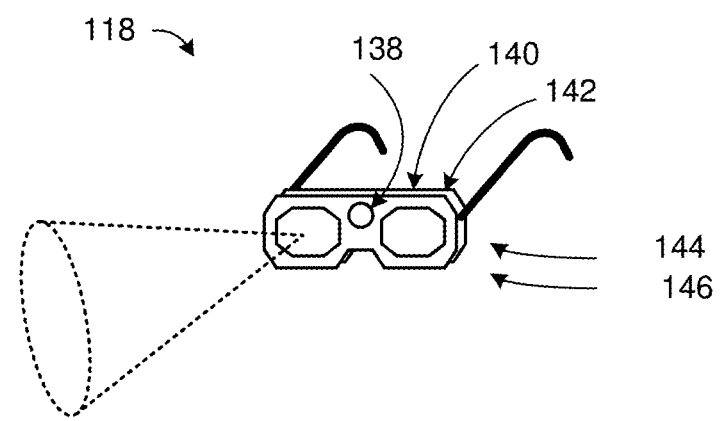
FIG. 5 is a first example of the viewing unit.

Referring now to FIG. 5, therein is shown a first example of the viewing unit 118. The viewing unit 118 can include smart glasses that can be worn over the user's eyes, smart contact lenses, or a similar system. The viewing unit 118 can display a representation of the physical world and the content 108 of FIG. 1 of the augmented reality system 100 of FIG. 1.

The viewing unit 118 can include displays, computing units, position sensors, orientation sensors, imaging units, and other similar components. Using the various sensors, the viewing unit 118 can present a display of the scene 124 of FIG. 1 to the user with the content 108 oriented properly within the scene 124 based on the object location 128 of FIG. 1 of the message 114 of FIG. 1.

The viewing unit 118 can display the real world imagery and provide an information overlay to display the system objects 126 of FIG. 1 in the proper location and orientation based on the real world. The sensors 138 of FIG. 1, such as the position sensor 140 and the orientation sensor 142, can determine the current location 144 of FIG. 1 of the user in real time and in the real world and align the display of information with the real world based on the current orientation 146. Thus, the viewing unit 118 can display the content 108 in the proper relative location when viewed through the viewing unit 118.

Figure 6:
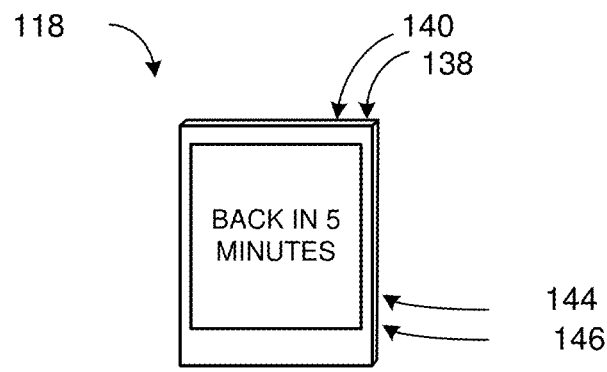
FIG. 6 is a second example of the viewing unit.

Referring now to FIG. 6, therein is shown a second example of the viewing unit 118. The viewing unit 118 can include a tablet computer or smart phone that can be viewed by the user. The viewing unit 118 can display the physical world and the content 108 of FIG. 1 of the augmented reality system 100.

The viewing unit 118 can also be configured to only display the content 108 and only when the viewing unit 118 is properly oriented and aimed at the location of the content 108. For example, the user can hold up the tablet computer and point the camera at the scene. The tablet computer, acting as one of the agents 116, can display the image from the camera and the augmented reality content overlay. Alternatively, the tablet computer can display specific content, such as a message.

The viewing unit 118, such as the tablet computer or smart phone, can include displays, computing units, position sensors, orientation sensors, imaging units, and other similar components. Using the various sensors, the viewing unit 118 can present a display of the scene 124 of FIG. 1 to the user with the content 108 oriented properly within the scene 124 based on the object location 128 of FIG. 1 of the message 114 of FIG. 1.

The viewing unit 118 can display the real world imagery and provide an information overlay to display the system objects 126 of FIG. 1 in the proper location and orientation based on the real world. The sensors 138, such as the position sensor 140 and the orientation sensor 142 of FIG. 1, can determine the current location 144 of the user in the real world and align the display of information with the real world based on the current orientation 146. Thus, the viewing unit 118 can display the content 108 in the proper relative location when viewed through the viewing unit 118.

Figure 7:
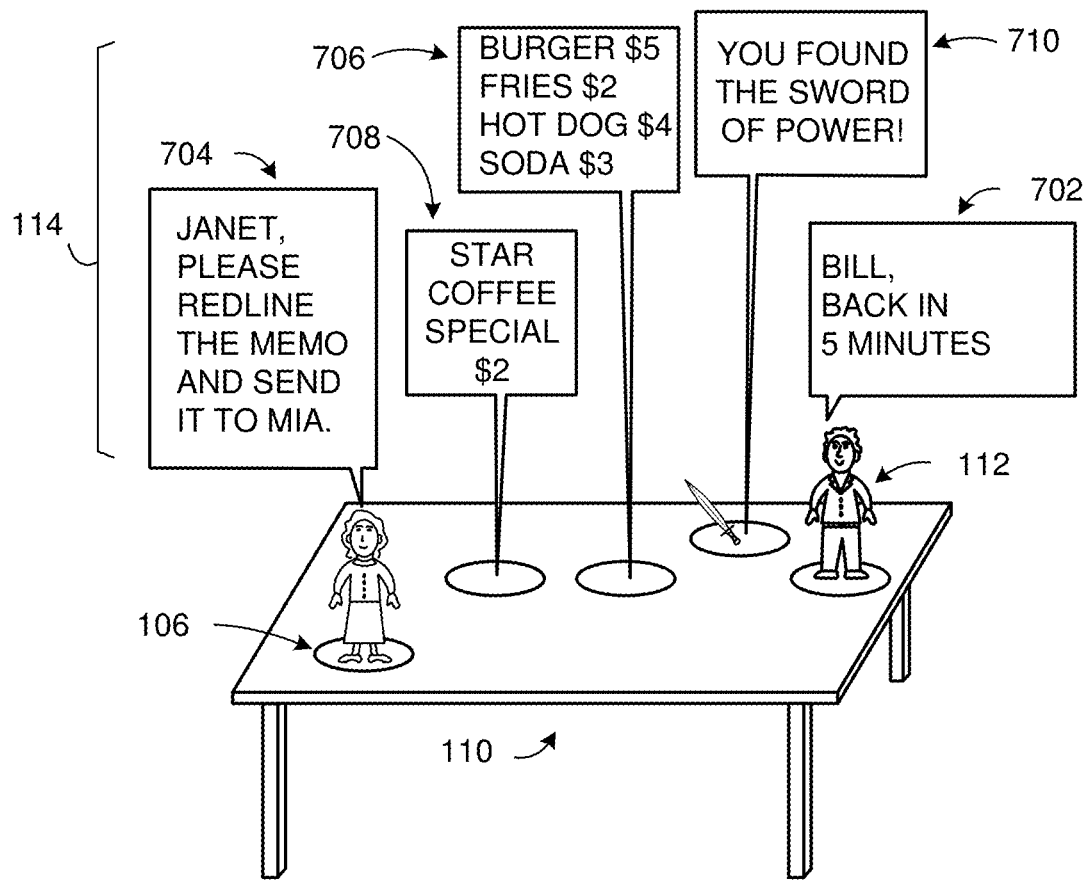
FIG. 7 is a first example of object visibility.

Referring now to FIG. 7, therein is shown a first example of object visibility. The augmented reality system 100 of FIG. 1 can include the content 108 intended for multiple users. Each piece of the content 108 of FIG. 1 can have the access rights 120 of FIG. 1 configured to only be visible to a particular user or group of users.

In an illustrative example, if two users seated at a shared table leave messages for two different users, then the messages can have the access rights 120 to only be visible to the intended user. Each of the users have created the message 114 for their intended viewer and associated the message 114 with one of the points of interest 106 on the item 110, such as the table. The message 114 can include information such as a personal note 702 to Bill, an email 704 for Janet, a menu 706, a daily special 708, and a game notice 710 for users playing a game.

Although the table includes both of the message 114, each of the targeted users can only perceive the message 114 that was intended for them. Here, Bill will only perceive the message for Bill and only Janet will perceive the message for Janet. Each user can also perceive the avatar associated with the message 114.

In addition, all users will be able to perceive the message 114 for the daily special 708 that says "Star Coffee Special $2" assigned to one of the points of interest 106 on the item 110, such as the table. The access rights 120 for the message 114 for "Star Coffee" are configured to be visible to all users.

Each of the users of the augmented reality system 100 can be provided with their own individualized virtual content based on their individual context including the current location 144 of FIG. 1, the current orientation 146 of FIG. 1, the object location 128 of FIG. 1, the object orientation 130 of FIG. 1, the field of view 132 of FIG. 1, and the access rights 120. The unique view can be facilitated by the use of the viewing unit 118 of FIG. 1 for the agents 116 of FIG. 1 which can include software running on devices such as a tablet computer, smart phones, e-readers, smart glasses, or a combination thereof.

There are many reasons to control the visibility within one of the points of interest 106. Because there can be any number of the points of interest 106 associated with any one of the object location 128, it is essential to reduce the visibility 134 of FIG. 1 of non-essential items to reduce the clutter of the scene 124 of FIG. 1. In addition, some of the items 110 in the scene 124 may not be visible because the visibility may be dependent on time or other factors.

The visibility 134 may be modified because one of the points of interest 106 may depend on an interaction with another object, item, or agent. For example, if one of the items 110 was enclosed in a virtual box, then it will only become visible when it is removed from the box. In another example, the items in a virtual treasure hunt may only be visible after other items have been encountered.

The visibility 134 can be dependent on the privacy of the content 108. For example, the privacy settings for the communications or the messages between the users can affect the visibility 134. Private messages from one user to one or more other users should only be visible to the intended recipients. In another example, the message 114 from a teacher to a group of students should only be visible to the students and the teacher. In yet another example, a teacher taking a group of students on a trip to a museum may provide pre-seeded content that is both time and privacy protected.

The visibility 134 can be controlled for commercial reasons. For example, entertainment content in the augmented reality system 100 can be made visible only to paying customers. Access to some of the content 108 can be limited based on membership, such as a club membership.

The augmented reality system 100 can allow users to selectively control what they view. Because some users may not be interested in some content, the user profile can be used to control the visibility of some items they do and do not want to see. The user can identify categories of items or individual items to make visible and ignore other items.

The visibility 134 can also be based on the distance between the user and the items 110. The distance can be measured in different ways based on the coordinate system of the current one of the frames of reference 102 of FIG. 1. For example, the items 110 that are far away can have reduced visibility. The items 110 that are in different rooms in the frame of reference 102 using the building coordinate system can be set to invisible.

The visibility 134 can also be controlled based on the result of a query operation. For example, if the user queries the system and one of the items 110 is returned, the returned item can be made visible only after being returned in the search result.

The visibility 134 is an access right and part of the general area of access control. Because the augmented reality system 100 sits between the agents 116 and the owner of each of the items 110, there needs to be an easy, low cost way to address and determine the visibility of the items 110. In some cases, the computational effort to determine the visibility of the items 110 can be offloaded to external data systems, such as systems owned or controlled by the owner of the items 110.

Figure 8:
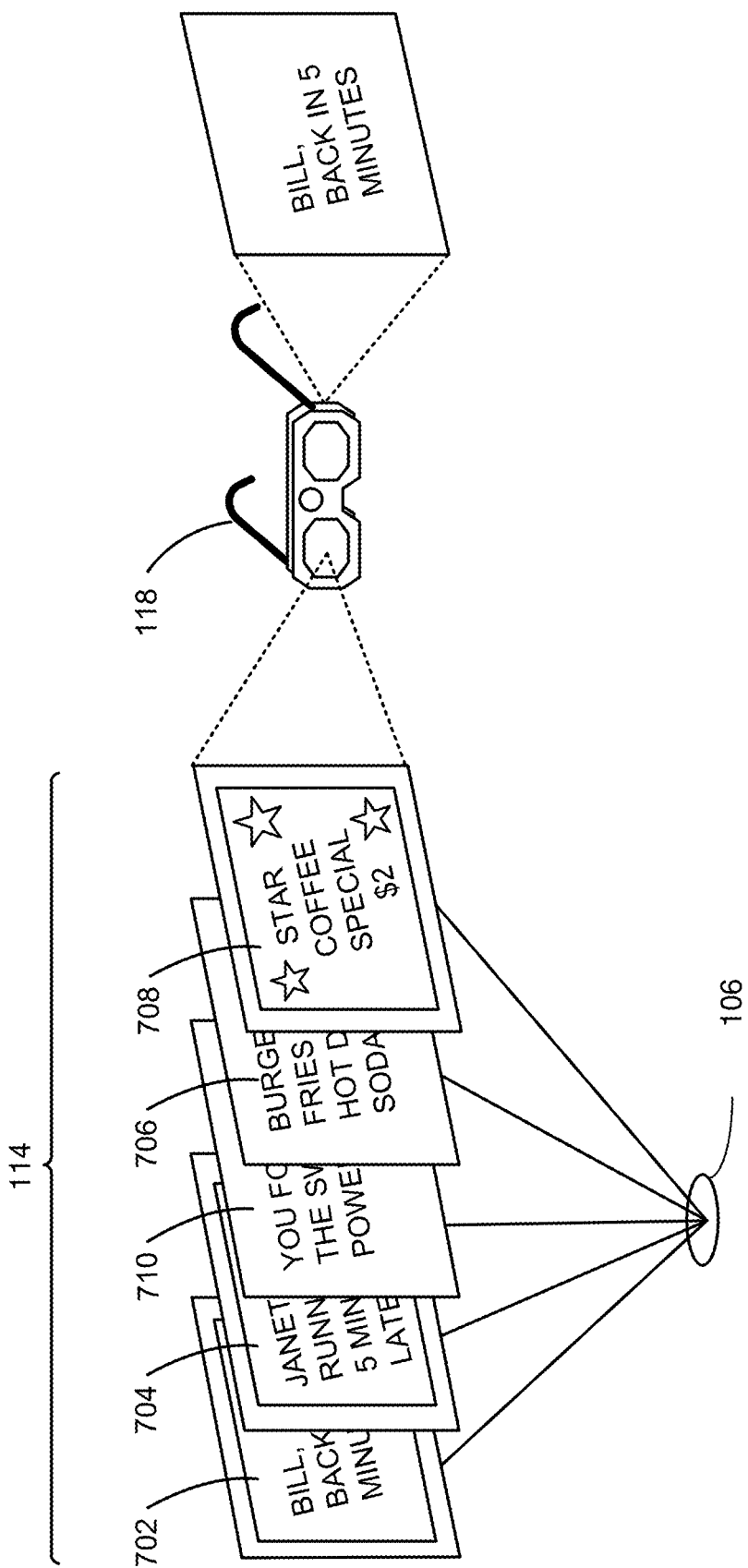
FIG. 8 is a second example of the object visibility.

Referring now to FIG. 8, therein is shown a second example of the object visibility. The viewing unit 118 can be configured to only display the content 108 of FIG. 1 corresponding to the access rights 120 of FIG. 1 of the user of the viewing unit 118.

In an illustrative example, one of the points of interest 106 can be associated with one or more of the content 108 each having a different set of the access rights 120. The viewing unit 118 can be configured to only display the content 108 and the message 114 having the marching set of the access rights 120 that are associated with the user of the viewing unit 118. The content 108 can be associated with one of the points of interest 106.

In this example, the viewing unit 118 of user Bill can perceive the personal note 702 addressed to Bill located at one of the points of interest 106. The user Bill can also view the general information such as the menu 706 and the daily special 708 that are visible to everybody. The viewing unit 118 cannot view the email 704 addressed to Janet because Bill does not have the access rights 120 to view that information. Further, if Bill is a user playing the game then a game notice 710 can been perceived saying "You have found the Sword of Power."

Figure 9:
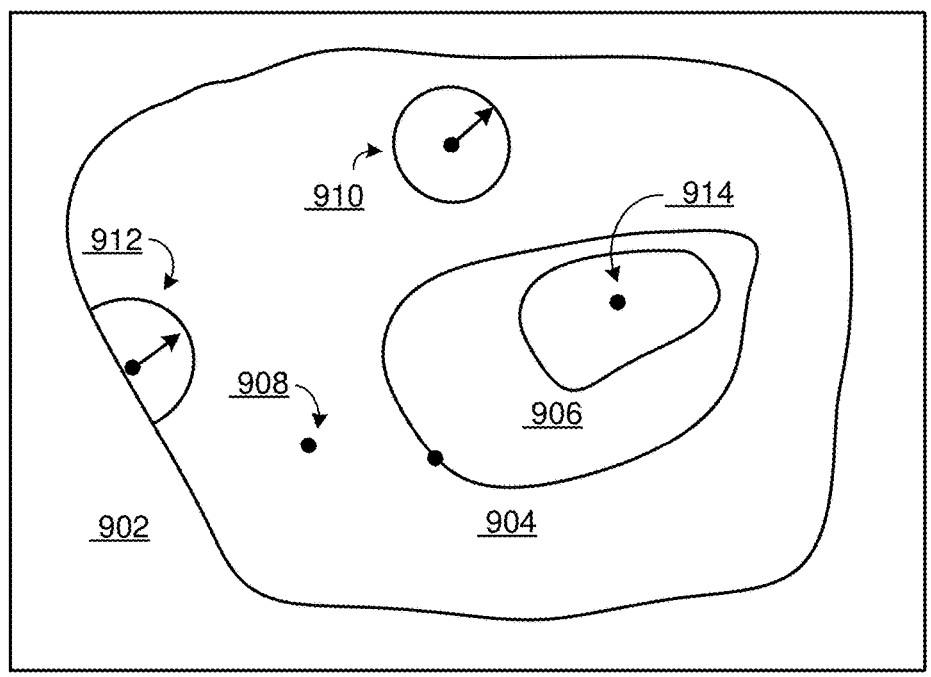
FIG. 9 is an exemplary diagram of the relationship between the frames of reference and the points of interest.

Referring now to FIG. 9, therein is shown an exemplary diagram of the relationship between the frames of reference 102 of FIG. 1 and the points of interest 106 of FIG. 1. The frames of reference 102 can include others of the frames of reference 102 and multiples of the points of interest 106.

One of the frames of reference 102, such as the first frame 902, can encompass one or more of the frames of reference 102 and the points of interest 106. Within the first frame 902 there can be several of the frames of reference 102 and several of the points of interest 106. a second frame 904, a third frame 906, a first point 908, a second point 910, a third point 912, and a fourth point 914. The frames of reference 102 can be in a hierarchical relationship. In some cases, the frames of reference 102 can be orthogonal and non-intersecting. In other cases, some of the frames of reference 102 can be overlapping.

The points of interest 106 can have different configurations. For example, a first point 908 can be one of the points of interest 106 that is defined by a single point in the geometry of the first frame 902. In another example, the first point 908 could be defined by a single room in one of the frames of reference 102 using a building geometry.

In yet another example, the second point 910 can be one of the points of interest 106 that is defined by a circular area around the coordinates of the second point 910. The second point 910 can be defined by a coordinate point and a description of the area around the coordinate point in the geometry of the first frame 902. The description of the area can include a simple radius, a description of a geometrical shape, a mathematical equation, or a combination thereof.

In still another example, the third point 912 can be one of the points of interest 106 defined by the coordinate of an arbitrary shape, such as a half circle or half sphere. The description of the area for the third point 912 can be defined by a set of coordinate points for the arbitrary shape, an image mask, relative coordinates based on an existing shape, or other descriptions of the arbitrary shape. If the third point 912 represents a sphere of a given radius centered on a point on a window of a building, then the description of the particular one of the points of interest 106 can include the portion of a sphere surrounding the third point 912 and within the building, resulting in a hemispherical volume for the third point 912 within the building. The portion of the sphere outside the building is not part of the third point 912.

Each of the points of interest 106 are only visible within one of the frames of reference 102. This is shown by the third point 912 which is only visible from within the first frame 902.

The first frame 902 can include a second frame 904 and a third frame 906. The second frame 904 can reside within the first frame 902. The third frame 906 can reside entirely within the second frame 904 and the first frame 902. This can be illustrated where the first frame 902 can be defined by physical geographic coordinates, such as GPS coordinates. The second frame 904 can utilize a building coordinate system. The third frame 906 can utilize a hierarchical coordinate system within the building coordinate system, such as a room-centric coordinate system, a book-centric coordinate system, a furniture-based coordinate system, or a similar descriptive coordinate system suitable for existing within the building coordinate system.

Users and the agents 116 of FIG. 1 can move between the frames of reference 102. For example, the agents 116 can move from the first frame 902 into the second frame 904 by interacting with one of the items 110 of FIG. 1 attached to the one of the points of interest 106 in the second frame 904.

The agents 116 can be in multiple frames at the same time. For example, when in a museum tour or when playing an augmented reality game, the agents 116 can be in one of the frames of reference 102 with the building coordinate system 302 and in another of the frames of reference 102 with the global coordinate system 202 of FIG. 2.

In another example, the agents 116 can move into the third frame 906 by entering into proximity to one of the points of interest 106 within the third frame 906. The third frame 906 can be one of the items 110 of one of the points of interest 106 of the second frame 904.

In an illustrative example, consider an augmented reality tour of a museum. The museum can be represented by the second frame 904 which can be one of the frames of reference 102 at a location within the first frame 902, which can be a GPS coordinate system representing the real world. The second frame 904 could be the frame of reference 102 for the museum as a whole using a building-centric coordinate system. The user or the agents 116 can enter the second frame 904 based on the physical proximity to the museum in the real world and interacting with one of the items 110, such as a virtual ticket window within the museum, to purchase the augmented reality museum tour.

Similarly, the third frame 906 can be a painting in the museum. When wandering through the museum, the painting can stand out as being one of the points of interest 106. But, when the user approaches the painting in the real world, the augmented reality system 100 of FIG. 1 can display the points of interest 106 that may be associated with the picture. The points of interest can be associated with the content 108 of FIG. 1 associated with the picture such as an audio track describing the picture, the message 114 of FIG. 1 associated with the painting style of the painting, or similar information.

Figure 10:
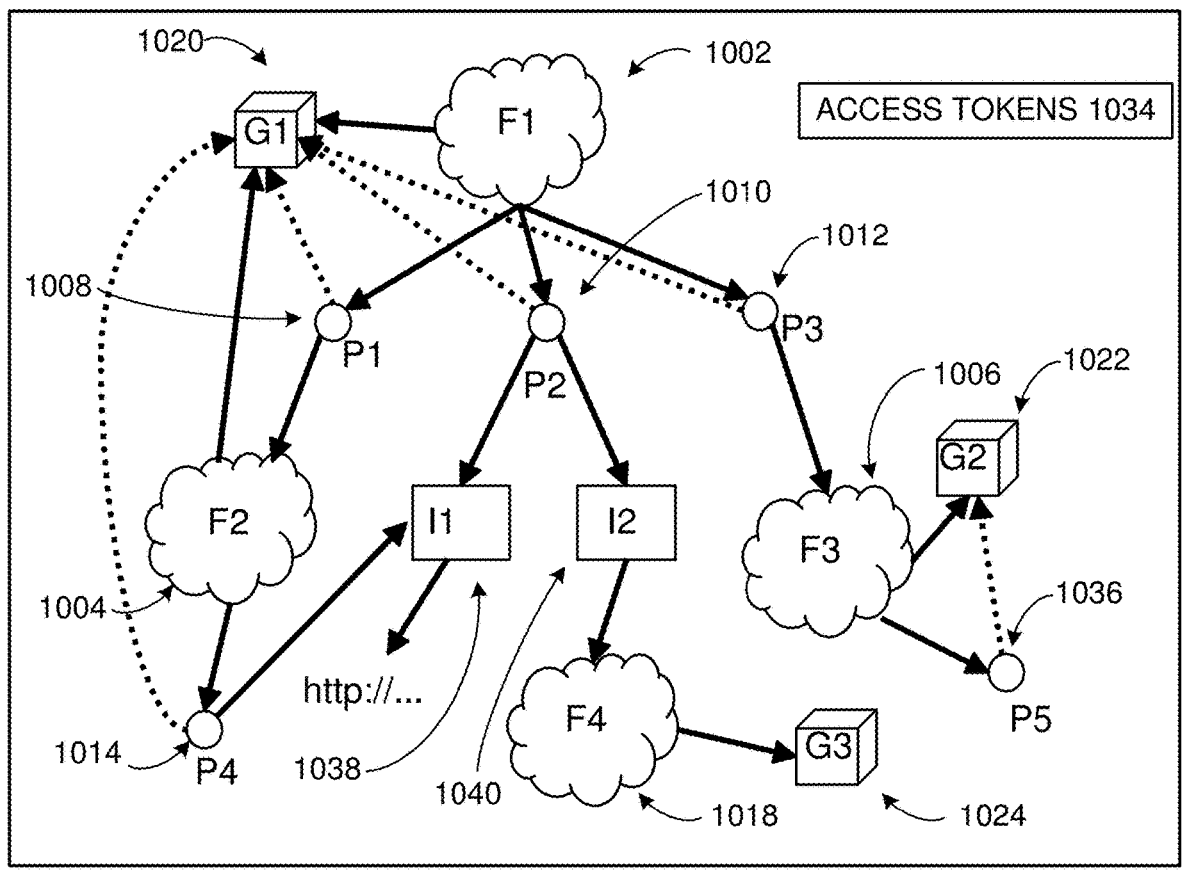
FIG. 10 is an exemplary diagram of the relationship between basic types.

Referring now to FIG. 10, therein is shown an exemplary diagram of the relationship between basic types. The basic types describe the system objects 126 of FIG. 1. The base types can include the frames of reference 102 of FIG. 1, the points of interest 106 of FIG. 1, and geometries.]

The frames of reference 102 can include a first frame 1002, a second frame 1004, a third frame 1006, and a fourth frame 1018. The points of interest 106 can include a first point 1008, a second point 1010, a third point 1012, a fourth point 1014, and a fifth point 1036. The geometries can include a first geometry 1020, a second geometry 1022, and a third geometry 1024. The geometries can describe the frame geometry 104 of FIG. 1 associated with the system objects 126.

Each of the frames of reference 102 can be associated with one of the geometries. For example, the first frame 1002 can be associated with the first geometry 1020. Similarly the second frame 1004, the third frame 1006, and the fourth frame 1018, can be associated with the second geometry 1022, the third geometry 1024, respectively.

The points of interest 106 can be associated with the system objects 126, such as the items 110 or other frames. The items 110 can include a first item 1038 or a second item 1040.

The first frame 1002 and the second frame 1004 can share the same geometry. Others of the frames of reference 102 can have their own independent geometries.

The points of interest 106 can share items with one of the items 110 residing in both of the points of interest 106. For example, the first item 1038 can be in both the second point 1010 and the fourth point 1014. The first item 1038 can be visible in both of the frames of reference 102. The first item 1038 can be associated with the content 108 of FIG. 1. The content 108 can be a URL linked to an external data system.

The first point 1008 and the third point 1012 can both be associated with one or more of the frames of reference 102. Each of the points of interest 106 can be encountered by being near one of the points of interest 106.

The second item 1040 can be linked to the fourth frame 1018 to show that the second item 1040 can interact with the fourth frame 1018. This can occur when one of the agents 116 of FIG. 1 can interact with the second item 1040 before being able to enter the fourth frame 1018. For example, the second item 1040 can be a virtual door that needs to be opened before one of the agents 116 can enter the fourth frame 1018.

The frames of reference 102, the points of interest 106, and the items 110 can be the system objects 126 that have functions and properties. This is similar to the generalized paradigm of object oriented systems.

One of the important properties of each of the system objects 126 in the augmented reality system 100 of FIG. 1 can be the visibility 134 of FIG. 1. Not all of the agents 116 in one of the frames of reference 102 can be aware of all of the system objects 126.

The augmented reality system 100 can include a set of access tokens 1034 (AT). Each method of the system objects 126 can be associated with some set of the access tokens 1034. Any one of the agents 116 associated with one of the access tokens 1034 has access to the system objects 126 controlled by the access tokens 1034. The access tokens 1034 are a mechanism to implement the access rights 120 of FIG. 1 for the system objects 126.

The visibility 134 is an important property of the system objects 126 and only the agents 116 possessing the appropriate ones of the access tokens 1034 can view the related one of the system objects 126. The same one of the access tokens 1034 can be used by more than one of the system objects 126. For example, all of the system objects 126 associated with one game can use one of the access tokens 1034, such as "Token A", to enable the visibility 134 of the system objects 126. Any one of the agents 116 having the "Token A" can perceive the system objects 126 in their game, but not necessarily the system objects 126 in other games.

The access tokens 1034 can be organized into the roles 122 of FIG. 1. Each of the roles can provide the agents 116 with a common set of abilities and attributes.

Figure 11:
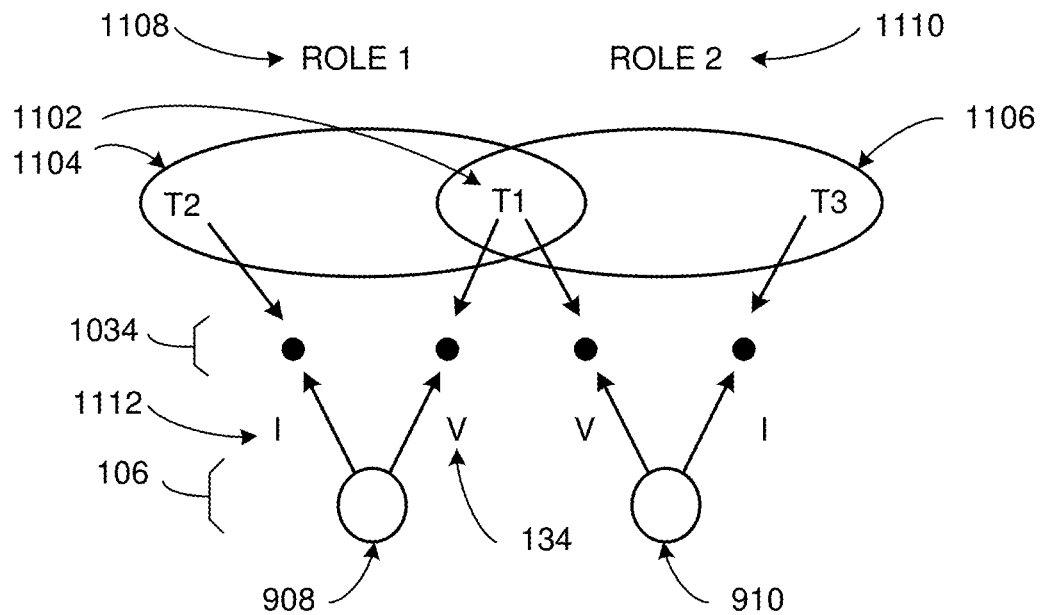
FIG. 11 is an exemplary diagram of the relationship between the points of interest and the roles.

Referring now to FIG. 11, therein is shown an exemplary diagram of the relationship between the points of interest 106 and the roles 122 of FIG. 1. Each of the roles 122 can have a property to represent the visibility 134 and an insert function 1112. The visibility property can determine the visibility 134 of the items 110 of FIG. 1 associated with the points of interest 106. The insert function 1112 can insert one of the system objects 126 of FIG. 1 into one of the points of interest 106.

Each of the roles 122 can include the access tokens 1034 of FIG. 10 for controlling access to some number of the properties and methods. For example, a first token 1102 can allow access to the visibility 134 for the first point 908 and the second point 910. The roles 122 can vary over time.

The roles 122 can control access to the insertion methods. For example, a second token 1104 can allow access to the insertion method of the first point 908. The third token 1106 can allow access to the insertion method of the second point 910. The tokens can be grouped to form the roles 122. The first role 1108 can include the first token 1102 and the second token 1104 for controlling the visibility 134 and the insert function 1112 of the first point 908. The second role 1110 can include the first token 1102 and the second token 1104 for controlling the visibility 134 and the insertion function 1112 of the second point 910.

At any point in time, one of the agents 116 of FIG. 1 can be associated with some of the roles 122 and some of the frames of reference 102 of FIG. 1. For example, one of the agents 116 can be associated with one of the frames of reference 102 by entering or leaving the physical location associated with the building of the frames of reference 102. Each of the agents 116 can be associated with the object location 128 of FIG. 1 and optionally the object orientation 130 of FIG. 1 as specified by the frame geometry 104 of FIG. 1 of the current one of the frames of reference 102. The frames of reference 102 can determine which of the points of interest 106 and the items 110 can be visible within the field of view 132 of FIG. 1 for the agents 116 based on the visibility 134 rights for the points of interest 106 and the items 110.

The augmented reality system 100 of FIG. 1 is intended to convey the object location 128 and some of the state and state changes of the system objects 126 for the agents 116. The augmented reality system 100 can store most of the information associated with the items 110, but it can also retrieve some of the information from external systems.

Figure 12:
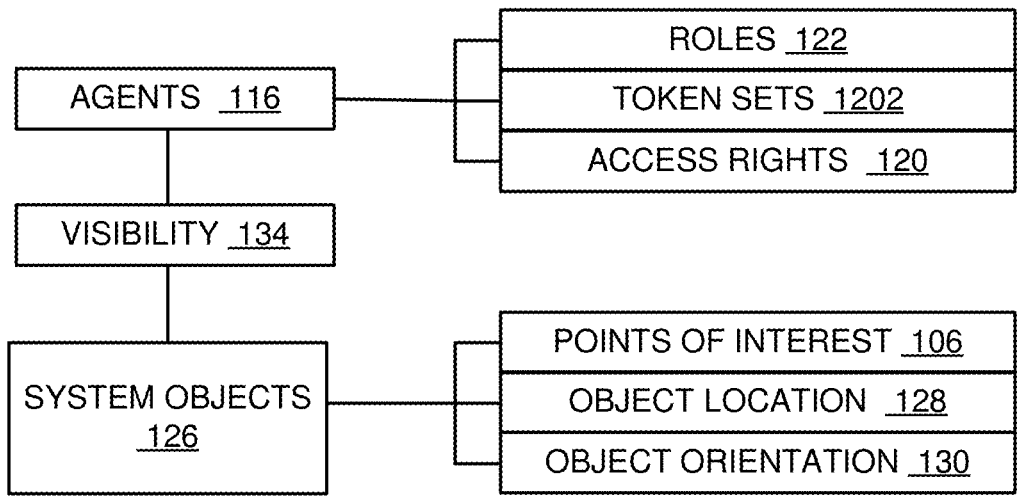
FIG. 12 is an example of the visibility properties.

Referring now to FIG. 12, therein is shown an example of the visibility properties. One of the system objects 126 can be associated with a set of properties and the access rights 120. The system objects 126 can be associated with the visibility 134 for a list of the points of interest 106, the object location 128, the object orientation 130, the roles 122, and token sets 1202.

The token sets 1202 can be an implementation of an authorization system. Each of the system objects 126 can have a set of the access rights 120. The access rights 120 can control functions such as create, delete, update, and other object-specific methods for the object and higher-level interactions. The access rights 120 can be grouped into the roles 122 or be individually assigned. The roles 122 can include both the individual ones of the access rights 120 and the token sets 1202.

For example, the augmented reality system 100 can use a variant of the role Based Access Control (RBAC) technique. Each of the system objects 126 can have a set of operations, such as being able to have access to some property of the system objects 126. Each of the operations can be associated with some set of the access tokens 1034. The access tokens 1034 can be known as permissions. Each of the roles 122 can be sets of the access tokens 1034. The token sets 1202 can be a set of the access tokens 1034 including sets that include the roles 122.

In an illustrative example, suppose there is a set of the system objects 126 each with a read and a write function. Further, one of the system objects 126 can be different from the others and need a different write function. The augmented reality system 100 can implement three of the access tokens 1034: NormalRead, NormalWrite, and SpecialWrite. Most of the system objects 126 can use one of the access tokens 1034, NormalRead, for the read operation and one of the access tokens 1034, NormalWrite, for the write operation. Some of the system objects 126 can be assigned the access tokens 1034 for SpecialWrite instead of NormalWrite.

The augmented reality system 100 can also include the access tokens 1034 to support three types of the roles 122: Reader, Writer, SuperUser. The Reader role can be assigned the Normal Read token. The Writer role can be assigned the NormalRead and the NormalWrite tokens. The SuperUser role can be assigned the SpecialWrite token.

The users associated with the Reader role can read. The users associated with the Writer role can write. And the users associated with the SuperUser role can have access to the SuperWrite token.

The agents 116 can be assigned a set of the roles 122 to determine the possible interactions with the system objects 126 in the frames of reference 102 of FIG. 1. The roles 122 associated with the agents 116 can vary over time.

The roles 122 can be implemented in a variety of ways. Because the number of the roles in the augmented reality system 100 can be arbitrarily large, the system must be able to represent and index a large number of the roles 122. Each of the system objects 126 can have their own set of the roles 122. The system objects 126 can be associated with the roles 122 from different sources. The roles 122 are time and location sensitive. The implementation of the roles 122 for the system objects 126 provides the fine grained semantics of the augmented reality system 100.

The agents 116 may have many of the roles 122 associated with them at one time, but the augmented reality system 100 of FIG. 1 can be configured to only track a subset at a particular time and location. For example, when the agents 116 are interacting with the items 110 of FIG. 1, the user can acquire certain of the roles 122 for a limited duration in a limited locale. The roles 122 associated with one of the items 110 can be removed when no longer needed.

For example, a game player could use one of the agents 116 associated with a general one of the roles 122 for making content and content updates from the game visible when the player is near the physical location of the content. But the player could additionally be assigned another one of the roles 122 associated with the game that provides the ability to interact with some of the items 110 in the game.

In another example, one of the agents 116 can interact with some of the items 110 to establish a contract that provides a set of temporary rights, such as giving consent in a shopping mall to receive advertisements from nearby stores. The access rights 120 can allow the exchange of shopper information for discount codes.

The visibility of the system objects 126 can be modified when the system objects 126 are added or updated in a particular location. However, an efficient mechanism must be used to map the visibility between the systems objects 126 and the agents 116 or the roles 122. One alternative mechanism to associate the list of the system objects 126 that are visible to each of the agents 116 or the roles 122 is to use the access tokens 1034. The augmented reality system 100 can be configured such that the number of the access tokens 1034 will not exceed the number of operations. One of the agents 116 can either perform an operation or not, so it is sufficient to have one of the access tokens 1034 per operation. Each of the roles 122 can have the access tokens 1034 or not. In practice, the total number of the access tokens 1034 will be much less. Similarly, the number of the roles 122 should no significantly exceed the number of the agents 116. Each of the agents 116 may have some unique abilities, such as self-modification, but the number of the shared capabilities will be far smaller than the total number of users.

Alternatively, in cases where many of the system objects 126 in one of the frames of reference 102 are similar, then groups of the system objects 126 can be operated on as a group. The group of the system objects 126 can be associated with the token sets 1202 that include a variety of properties and methods that apply to all of the system objects 126 in the group.

The visibility 134 can be implemented in a variety of ways. For example, the first level of the visibility 134 is associated with the roots of the coordinate system that the agents 116 have perceived or have access to. The agents 116 can have access to a basic set of the roles 122 associated with the global space of one of the frames of reference 102, such as one using a GPS coordinate system. The roles 122 can expose some of the items 110 near the current location 144 of FIG. 1 of one of the agents 116. Interaction with the items 110 can expose additional ones of the roles 122 related to the items 110.

The roles 122 associated with the visibility 134 can be linked to one or more of the frames of reference 102 and the frame geometry 104 of FIG. 1 associated with them. The concept of a geometry is a technique to better segment the points of interest 106 in a more organized and coherent fashion.

For example, if the user is in a museum, then the point of interest 106 can be located within the frame geometry 104 of the museum, such as using a building coordinate system rather than GPS. Using a building coordinate system can be much more accurate, as GPS is limited in accuracy and may not even be available indoors, while a model of the interior of the museum can be used for the building coordinate system and enhanced with other location information such as beacons or WiFi access point information.

Figure 13:
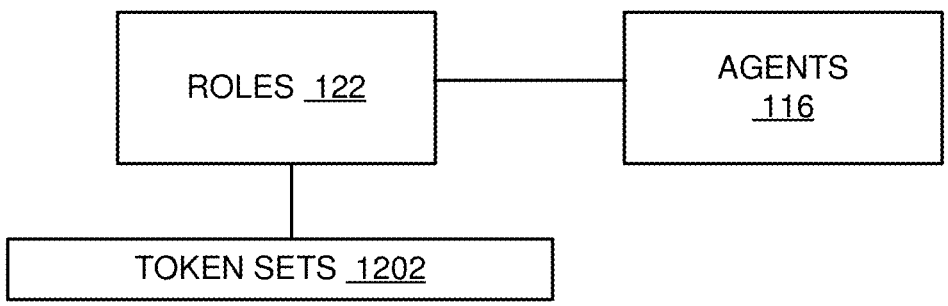
FIG. 13 is an example of the roles and the token sets.

Referring now to FIG. 13, therein is shown an example of the roles 122 and the token sets 1202. The agents 116 can be associated with the roles 122 which can be further associated with one of the sets of tokens 1202.

Each of the agents 116 can have a variety of the roles 122. However, because the number of the roles 122 can proliferate quickly, there is a need to control the total number of the roles 122 associated with each of the agents 116 to better manage system resources. Further, when one of the agents 116 moves, the augmented reality system 100 of FIG. 1 must update the set of the points of interest 106 of FIG. 1 nearby including detecting and managing any of the points of interest 106 that have been added or updated. This process must be managed efficiently in terms of system resources.

To do this efficiently, the amount of data manipulated by the augmented reality system must be reduced using a variety of techniques. For example, working memory should be used to determine what real-time actions must be taken. The code and data structures should be cached in physical memory or otherwise organized to reduce the overhead of disk accesses. Using locally cached information can improve the performances when informing the users about the creation, updating, and deletion of the system objects 126 of FIG. 1. Further, system maintenance tasks, such as updates and other notification, can be distributed around the augmented reality system 100 to increase the degree of parallelism.

Each of the system objects 126 has a set of the roles 122 associated with the visibility 134 of FIG. 1, as well as a visibility range 1302 in which it is visible, expressed in terms of the frame geometry 104 of FIG. 1 it belongs to. The visibility range 1302 is the distance where one of the system objects 126 can been visible. If one of the system objects 126 is updated or added to the augmented reality system 100, then only the agents 116 with the appropriate one of the roles 122 and in the current location 144 of FIG. 1 properly configured with respect to the geometry need to be updated.

Figure 14:
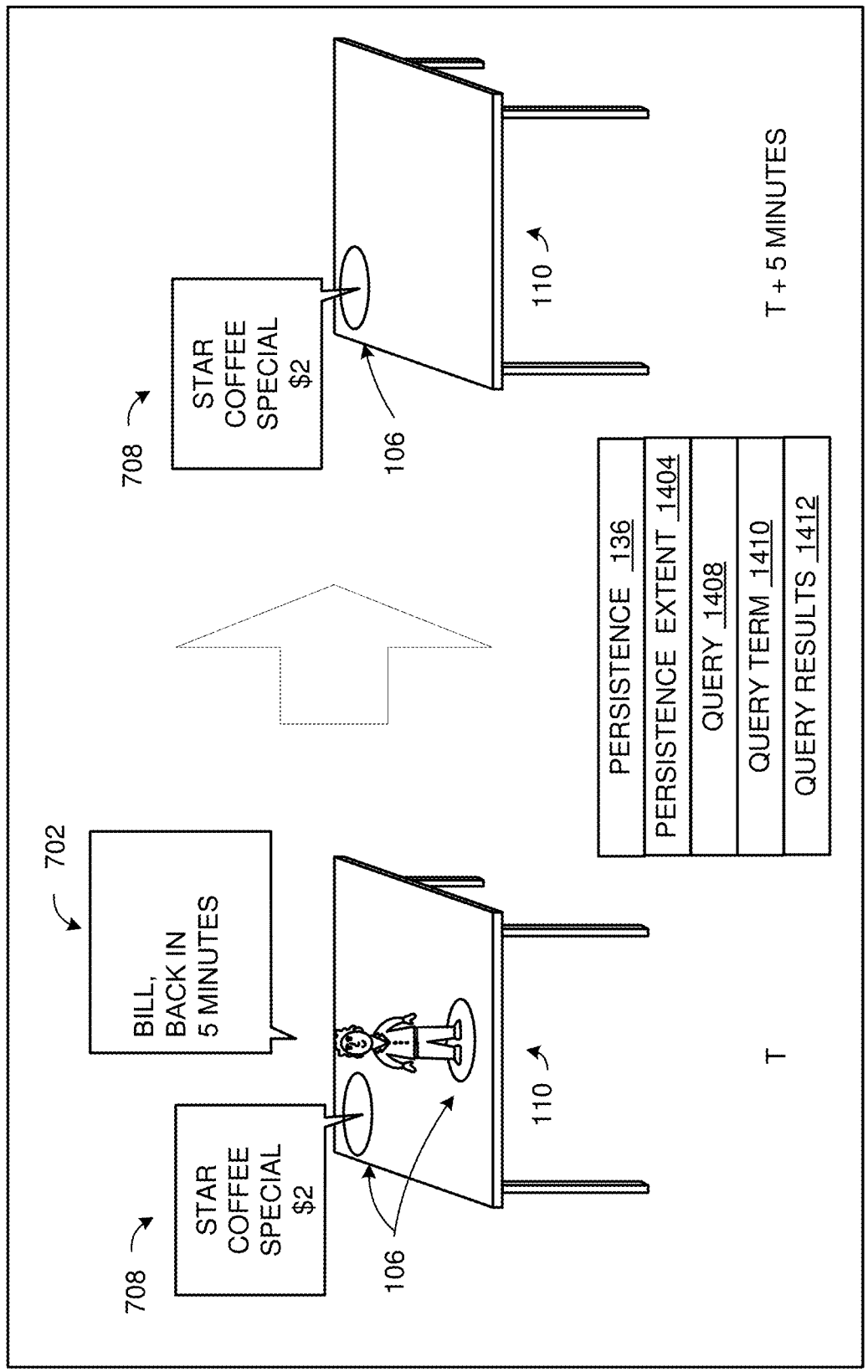
FIG. 14 is an example of the persistence.

Referring now to FIG. 14, therein is shown an example of the persistence 136. The persistence 136 is determined by a set of properties, often hierarchical, that can define lifecycle of the object location 128 of FIG. 1 of one of the system objects 126 of FIG. 1.

In an illustrative example, a user can create one of the system objects 126, such as the personal note 702, and associate it with the access rights 120 of FIG. 1 to be visible to the user Bill. One of the items 110 associated with one of the points of interest 106, such as a table, can be associated with a message for the daily special 708 and the personal note 702. Because the message is time-sensitive, the personal note 702 can be configured to have the persistence 136 set to 5 minutes. After the personal note 702 is created, it will automatically be deleted after 5 minutes. However, the persistence 136 of the daily special 708 can last for the entire day.

The persistence 136 is inherently tied to the interface between the real world and the augmented reality world. Preserving the persistence 136 of the system objects 126 can be negatively impacted because of the unreliability of the sensor needed to locate the system objects 126, such as the items 110, in the real-world. The processing required to properly manage the current location 144 of FIG. 1 of the system objects 126 must be robust.

To efficiently manage the augmented reality system 100 of FIG. 1, the points of interest 106 can be segmented based on the frames of reference 102 of FIG. 1. Each of the points of interest 106 can be associated with one of the frames of reference 102 to accurately determine the current location 144 of the points of interest 106 based on the frame geometry 104 of FIG. 1 of the selected one of the frames of reference 102.

Two of the frames of reference 102 are generally constant. First, the global coordinate system 202 of FIG. 2 using GPS location and time. Second, a personal coordinate system of one of the agents 116 of FIG. 1. This can be a coordinate system that physically tracks one of the agents 116 in the real world. Other coordinate systems are entered and exited based on the interactions with the points of interest 106 by the agents 116.

Each of the agents 116 can enter and interact with one of the frames of reference 102 in a variety of ways. For example, the agents 116 can enter the frames of reference 102 by fiat. Each of the agents 116 is automatically in two of the frames of reference 102, the global coordinate system 202 and a personal coordinate system 1406 of one of the agents 116. The agents 116 can also be associated with additional ones of the frames of reference 102, either through external interactions such as by buying rights or joining a game.

In another example, one of the frames of reference 102 can be linked to an existing one of the frames of reference 102. For example, the global coordinate system 202 provides a persistent hierarchy that the agents 116 are always aware of. One of the agents 116 can become aware of certain ones of the points of interest 106 as it maneuvers around the space defined in the global coordinate system 202 as indicated by the GPS coordinates. One of the agents 116 can simultaneously enter another one of the frames of reference 102, such as the building coordinate system, when it has access to the roles 122 of FIG. 1 for the system objects 126 related to that one of the frames of reference 102.

One of the frames of reference 102 can announce itself, such as by using a beacon signaling the proximity to one of the agents 116 in the real world. For example, where one of the frames of reference 102 is an airplane, the entire local system can move together and the items 110 in the frame of reference 102 of the airplane can be controlled locally as part of the local frame. The system objects 126 and the points of interest 106 associated with the airplane can be discovered when the airplane is approached in the real world. The points of interest 106, such as the seats in the airplane, may only be visible when the agents 116 are interacting with the frames of reference 102 associated with the airplane, such as when using a flight reservation system.

The frames of reference 102 can also be discovered through a query 1408. The augmented reality system 100 can support querying to search the system objects 126 within the system. The query 1408 is a search operation to find the system objects 126 that match a query term 1410. The query term 1410 is a list of search terms or objects to be found. A query result 1412 is returned after executing the query 1408. The query result 1412 is a list or set of the system objects 126 that match or are associated with the query term 1410.

Using a book example, one of the agents 116 could make the query 1408 in one of the frames of reference 102, such as a book store, and retrieve a set of books. Each of the books can be represented in one of the frames of reference 102 using a book coordinate system. Thus, one of the agents 116 can interact with the points of interest 106 within a book, such as leaving an annotation attached to a paragraph on one of the pages.

It has been discovered that implementing a hierarchical approach with multiple types of the frames of reference 102 increases functionality for the augmented reality system 100. By adding annotations to the points of interest 106 of the book, the visibility 134 of FIG. 1 can be controlled to limit access to the annotations to only some of the agents 116 when they are in one of the frames of reference 102. Providing a means to localize the scope can reduce the data traffic, simplifies the user interface, and improves the overall user experience.

When any one of the system objects 126 is created, it must be associated with at least one of the frames of reference 102. Each of the system objects 126, such as one of the points of interest 106 or one of the items 110, can have a persistence extent 1404, such as a time to live parameter. The persistence extent 1404 of one of the system objects 126 can control the length of time it will exist within the augmented reality system 100.

In static circumstances, the items 110 can reside at one of the points of interest 106 in a particular one of the frames of reference 102. However, if one of the items 110 is in motion, such one associated with one of the points of interest 106 like a sword being swung in an augmented reality game, then the augmented reality system 100 can define one of the points of interest 106 that covers a three-dimensional volume. The items 110 can be displayed anywhere within the volume of the particular one of the points of interest 106. Exact information about the whereabouts of one of them items 110 can be provided by the game server or another application specific system. This can allow the application specific systems to process complex, local interactions to take the processing burden off of the augmented reality system 100. When the particular one of the items 110 becomes stationary, the augmented reality system 100 can associate it with a stationary one of the point of interest 106.

Alternatively, one of the agents 116 can be designated as one of the frames of reference 102 and the items 110 associated with this one of the frames of reference 102 can be tracked by other ones of the agents 116.

In an illustrative example, the augmented reality system 100 can provide one of the frames of reference 102 to represent the entire universe. Since most of the agents 116 would not need to access the information outside of the global coordinate system 202 used to represent the earth, the agents 116 not interested in astronomical phenomenon would never enter it.

The augmented reality system 100 can include a number of the items 110. Each of the items 110 can have associated content and can be linked to one or more of the points of interest 106. Each of the points of interest 106 can be located in one of the frames of reference 102 and has some associated information. Each of the frames of reference 102 includes the frame geometry 104 that specifies to the agents 116 how to use and access the associated ones of the points of interest 106. The frame geometry 104 can also help determine the visibility 134 of the points of interest 106. If one of the points of interest 106 is visible to one of the agents 116 then that agent can interact with the items 110 associated with it.

The augmented reality system 100 can track the agents 116 including knowing the current location 144, the current one of the frames of reference 102, the token sets 1202 of FIG. 12, the access rights 120, and other properties, parameters, and methods. The augmented reality system 100 can provide the information needed to locate the points of interest 106 and to manipulate the items 110 associated with each of the points of interest 106.

It has been discovered that displaying the system objects 126 based on the persistence 136 and the persistence extent 1404 can improve performance by reducing system overhead. Tagging each of the system objects 126 with the persistence 136 if the system objects 126 are active at the current time 154 simplifies the detection of the system objects 126.

Figure 15:
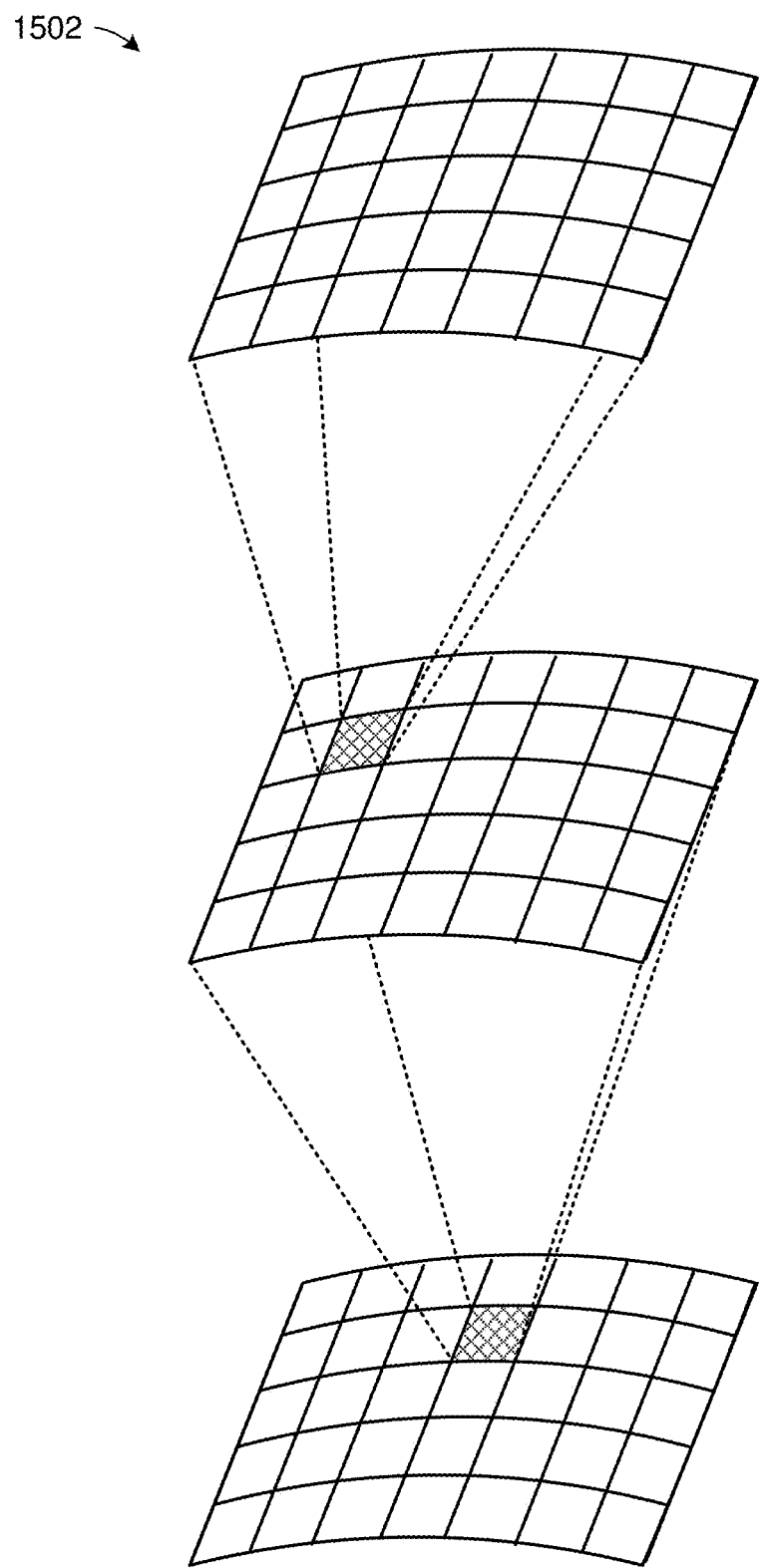
FIG. 15 is an example of the multi-level maps.

Referring now to FIG. 15, therein is shown an example of multi-level maps 1502. The multi-level maps 1502 show the hierarchical structure of one of the frames of reference 102 of FIG. 1.

At a high level of abstraction, the augmented reality system 100 of FIG. 1 can represent an arbitrarily large number of the system objects 126 of FIG. 1 scattered around a surface, each visible within some range. This can be represented using the global coordinate system 202 of FIG. 2 and using the multi-level maps 1502 that partition different levels of detail. This is similar to the way that Google™, Amazon™, and other mapping systems represent large areas. The multi-level maps 1502 show the same terrain at various levels of scaling. Each level provides some amount of detail based on what is visible at that level, or what was considered relevant by the map creator, with more detail presented at higher levels of scaling.

The augmented reality system 100 can use a similar technique to represent the frames of reference 102 at different levels of granularity. Each level contains a number of the points of interest 106 of FIG. 1, but each one of the points of interest 106 has the visibility range 1302 of FIG. 13 associated with it. The level of the map can be proportional to the visibility range 1302 of the points of interest 106 that it contains. This can define the set of the system objects 126 visible at some level of resolution.

For example, in a scene zoomed out to view the entire United States of America, the Pentagon might be visible as a landmark but would disappear as the user zooms in to the western United States. For a military client using the augmented reality system 100, however, it can be important to always know where the Pentagon is. Appearance at a level indicates the points of interest 106 that are visible to users within the area displayed, so the set of the points of interest 106 to display can be additive going down.

When navigating to a lower levels of the multi-level maps 1502, the degree of detail can get down to the point where one of the agents 116 of FIG. 1 is in physical proximity to the one of the points of interest 106 and further detail cannot be resolved because of the limits of measuring the physical location of the user. At some point, the successive location refinement breaks down and exceeds the granularity of the GPS sensors and the degradation of GPS signals and the exact mapping of the system objects 126 in the augmented reality system 100 may no longer be correct.

For example, a virtual object can be associated with one of the points of interest 106 located on the corner of a table. If the table is moved and the resolution of the system exceeds the GPS resolution, then the virtual object may now appear to be floating in space. Therefore the system needs to be able to combine results from multiple algorithms. The augmented reality system 100 can use a variety of scene analysis techniques and incorporate the generic functionality as needed to identify and manage scene information.

At this level of detail, the augmented reality system 100 can utilize another of the frames of reference 102, such as a room coordinate system, and use the physical geometry of the location, orientation, and additional semantics of placement to identify one of the points of interest 106 as being attached to the representation of the table, as opposed to a particular GPS coordinates. The additional information can include computer vision information, SLAM, beacon data, physical sensor data, tagged data points, physical mapping data, or similar information. This additional information can be extremely important. For example, given two of the points of interest 106 that are in two stores in a mall adjacent to each other, placed against the wall. Person A is in store 1 and person B is in store 2, each looking at the wall. Each person should just perceive one of the points of interest 106 and not the other in the other store.

In terms of coordinates, the points of interest 106 could be just a couple of inches from each other and thus difficult to physically differentiate. However, given diagram of the mall architecture, the augmented reality system 100 using a building coordinate system for one of the frames of reference 102 would allow the points of interest 106 to be differentiated. Additionally, "knowing" that the user is in a store with a wall between the points of interest 106, the augmented reality system 100 can determine the visibility 134 of FIG. 1 of each of the points of interest 106 and display the points of interest 106 appropriately.

The different ones of the frames of reference 102 can be used where the GPS information is unavailable or unreliable. For example, using the building coordinate system 302 of FIG. 3 can allow the visual information about the environment of one of the agents 116 to be used to determine the finer grained location of one of the system objects 126. If one of the items 110 of FIG. 1 is located underneath a virtual table in the corner of a room, then the position of the item can be determined simply by knowing the GPS location of the table and knowing that wherever the table is located, the message is underneath. The exact location of the message can be determined relative to the physical structure of the table because the item is associated with the table.

In terms of the persistence 136 of FIG. 1 of the items 110, one of the system objects 126 can exist if it can be located in the appropriate data structure representing the system objects 126 in one of the frames of reference 102. However, because the system objects 126 can enter and leave one of the frames of reference 102 at any time, the augmented reality system 100 must keep track of where the agents 116 are located so they can receive updates for relevant changes to the state and location of the system objects 126.

The augmented reality system 100 can be implemented in a variety of ways. In addition, certain operations within the augmented reality system 100 can be optimized to reduce the overall system computational load. For example, the one of the operations can include finding all of the system objects 126 for some set of the roles 122 of FIG. 1 associated with one of the points of interest 106.

In addition, another of the optimized operations can package the necessary data for the system objects 126 that are transferred to a different location or a different one of the frames of reference 102. Because the amount of data may be arbitrarily large, it can be impractical to maintain all data in active memory. The optimization can minimize the number of disk accesses by reducing the amount of data. Reducing the data can also minimize the latency of sending the system objects 126 data to one of the agents 116. For example, packaging the system objects 126 can include data compression to reduce the overall data size.

Other optimizations can include adding and moving the system objects 126, and finding all of the agents 116 in a defined area, and broadcasting updates to a set of the agents 116. The broadcast updates can include changes to the system objects 126 such as when the system objects are new, moved, and removed. The optimizations can be implemented based on the coordinate system used by each of the frames of reference 102.

Although the augmented reality system 100 may appear to provide a single, seamless continuum of the objects, the levels, and the frames of reference 102, it can be implemented in a decentralized manner. Some of the more complex of the frames of reference 102 can be managed by local systems or application specific systems to reduce the processing load on the augmented reality system 100. This can include the frames of reference 102 such as airplanes, stores, malls, building, gaming establishments, libraries, or other complex systems that are conceptually embedded in a larger one of the frames of reference 102, such as one using the global coordinate system 202. These systems may require large amounts of processing power to interact with. For example, when one of the agents 116 enters a store, the particular one of the frames of reference 102 for the store can be managed by a local server. This can improve the performance of the system when dealing with rapid, real-time changes, such as during action-intensive portions of a game.

Figure 16:
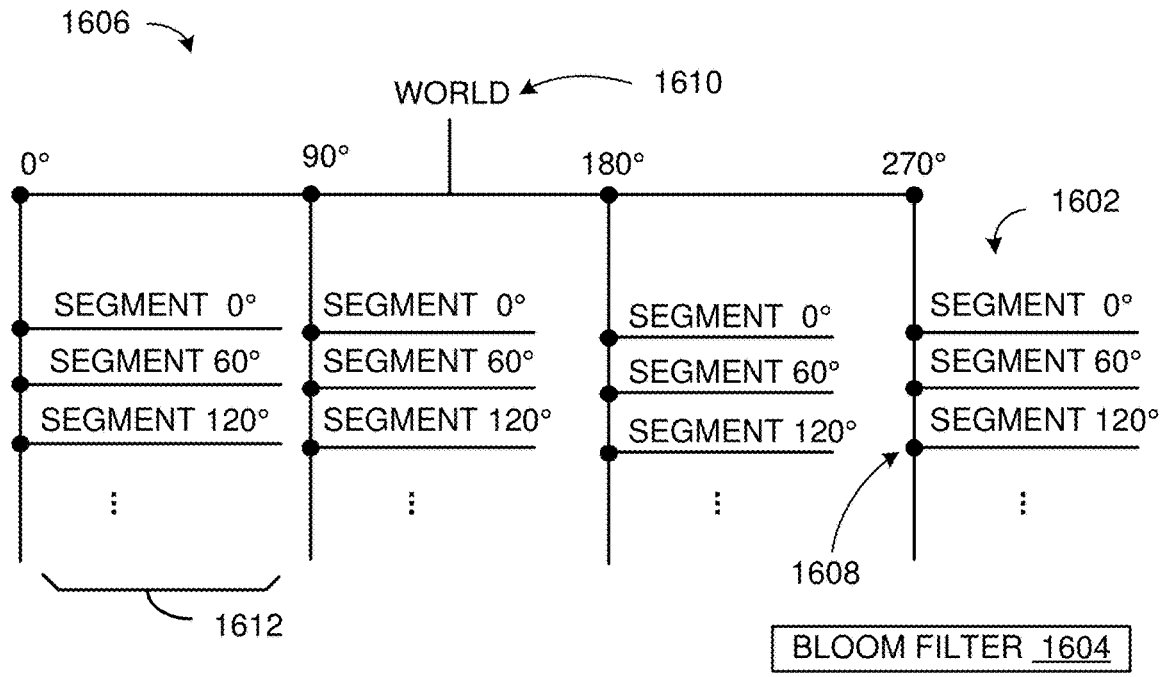
FIG. 16 is an example of the global coordinate system for the frames of reference.

Referring now to FIG. 16, therein is shown an example of the global coordinate system 202 of FIG. 2 for the frames of reference 102 of FIG. 1. The global coordinate system 202 can be used for navigation within one of the frames of reference 102.

In the global coordinate system 202, the world can be divided into segments 1602. The segments 1602 are sized to be manageable pieces. For example, the world can be divided into the segments 1602 by longitude and then latitude. In another example, the world can be divided into the segments 1602 using a binary tree structure.

There is a need for a rapid way to check the segments 1602 for the roles 122 of FIG. 1 that may apply to them. A rapid way to do that is to associate each region with a Bloom filter 1604. The Bloom filter 1604 is a test to determine whether an element is a member of a set.

For example, each one of the roles 122 can be assigned a unique integer and is then hashed to some set of values, representing the bits to be checked. This can be done when each of the roles 122 is created, so the hashes only needs to be calculated once. Similarly, each of the users can have a signature represented by OR-ing of the each of the hashes of the roles 122. This gives a list of bits that need to be set in the Bloom filter 1604, each with a list of the roles 122 dependent on that bit. The Bloom filter 1604 can determine if there is any relevant content in one of the segments 1602 by checking the Bloom filter 1604 for each of the agents 116 of FIG. 1, removing any of the roles 122 where the associated bit is not set, and then seeing which of the roles 122 are left. Based on the way the Bloom filter 1604 works, there is a very high probability that each of the segments 1602 have some of the system objects 126 of FIG. 1 with the roles 122 that remain.

In another alternative example, each of the access token 1034 of FIG. 10 can be assigned a unique integer. Each of the roles 122 can be represented by the union (OR operation) of the bits of its access tokens 1034 and each of the agents 116 similarly having the union of the bits of the roles 122 associated to it.

Each operation can have another of the access tokens 1034, which can be represented by a unique integer and then hashed to some values, and calculated once. Each of the roles 122 can include a set of the access tokens 1034, so it has a set of bits from the union of the bits for all its access tokens 1034. Finally, each of the agents 116 can have a set of the roles 122 which is also representable as the union of the bits from the roles 122 associated with it.

At status checking time, some set of these bits can be checked. Since each bit is associated with at least one of the tokens, any bit not set means at least one of the access tokens 1034 is eliminated. If there is no relevant content in the segment, then processing is reduced because it is likely that only one bit per token needs to be checked.

The bits representing the access tokens 1034 can be put in an array using a first in, first out (FIFO) queue for efficiency. The first bits from each array can be entered in the queue. The augmented reality system 100 can repeatedly de-queue a bit and check it. If the bit is present, then place the next bit from that one of the access tokens 1034 in the queue. If the bit is not present, then that one of the access tokens 1034 is eliminated from further consideration. If all the bits from at least one of the arrays in the filter is found, then the system can check for content.

In an illustrative example, a complete Earth-based system can have approximately 510 trillion square meters of surface area. It would be reasonable to use the Bloom filter 1604 operation on each of the frames of reference 102, especially as most locations will have few of the points of interest 106 of FIG. 1. But even breaking the surface into only one billion of the segments 1602 means that one gets from the surface of the earth to a square meter in 49 levels or binary orders of magnitude. If we only consider areas of 10 meter$^2$, then only 48 levels are required to uniquely identify 100 trillion of the segments 1602, if the segments 1602 are structured into a segment tree 1606.

Each level can correspond to the visibility 134 of FIG. 1 for the system objects 126. At the top level, one of the system objects 126 is only visible within 10 meters is at the 10 meter$^2$ level. Most the system objects 126 should be concentrated at the lower levels with visibility of just a few meters or kilometers and only a few should have visibility beyond that. In addition, the points of interest 106 will generally be highly concentrated in inhabited areas. It is estimated that 95% of the earth's population is concentrated in 10% of the surface area and urban areas cover just 3%. Even these contain large areas which would have few of the points of interest 106, which would probably be clustered around a small number of areas.

One way of organizing the segments 1602 that only requires creating occupied segments is to identify them with a technique such as geo-hashing, where the bits of the hash are from successively adding longitude and latitude bits, so longer values are more accurate than shorter ones. In effect, the first bit specifies east or west hemisphere, the second specifies north or south of the equator, etc. Each bit adds to the precision. In general, therefore, locations that are near each other will hash to strings with a common prefix.

To accomplish this, the segments 1602 of varying sizes can be organized in the segment tree 1606, where nodes 1608 of the segment tree 1606 have some substring of an address. The path through the segment tree 1606 from a root 1610 to leaves 1612 contains the whole key, but each interior one of the nodes 1608 can contain a substring from its parent down to the area actually containing something.

If everything being tracked is within a few meters of each other, there is only one of the nodes 1608 with a whole key. For example, if everyone were in either NYC or Moscow, there would be a root node, left and right hemisphere the nodes 1608 with long substrings, and then a set of the nodes 1608 near the leaves 1612 the frames of reference 102 the local dispersion. However, if the tracked system objects 126 are evenly spread around the world, then each one of the nodes 1608 would only have one bit of the hash and the full tree would be there. Each segment would need a "dirty word" giving the time of the last update. One could have this refer to whether there's been a change in the subtree, or just one of the segments 1602. We prefer the latter, as writes are expensive, especially writes that imply synchronization over large parts of the data structure.

This way the size of the segment tree 1606 is proportional to the dispersion of tracked the system objects 126 around the earth. In particular, the leaves will closely match this dispersion, and they consist of at least half of the nodes 1608 in the segment tree 1606. Where there are few of the points of interest 106, there is no need to generate the segment tree 1606 all the way to the leaves. If there is a fixed cost to looking at another level of magnification, then there is some number of the points of interest 106 at which it's less costly to store them at a level of higher magnification and do some filtering than to break a level up so each of the points of interest 106 is at the right range.

The segment tree 1606 can be used for both inserting the system objects 126 and identifying affected ones of the agents 116. The size of the segment tree 1606 depends on the number of the nodes 1608, and the number of the nodes 1608 is a reflection of the time it takes to process the contents of one of the nodes 1608. For example, if we have the segment tree 1606 in which we've inserted one of the points of interest 106, then the agents 116 entering the system will traverse down the segment tree 1606 to locate the one of the points of interest 106 it needs. At any one of the nodes 1608 it may need to do some processing. This will take a certain amount of time. One of the nodes 1608 can be split when the time to process its contents is above some threshold, such as ensuring a service level agreement (SLA) of under 200 milliseconds.

Each of the system objects 126 that belong in one of the segments 1602 can be arranged so their data on disk to can be read in a small number of disk accesses. For example, a system such as HBase can store all the data for a segment so that it is grouped together. Once all the data is read, it's easy to filter through to retain only those necessary for the agents 116. Traversing down the segment tree 1606 can be done in parallel, with the forking tasks to look at all the sub-segments of any of the segments 1602.

Nevertheless it's necessary to consider the possibility of congestion at any level of the segment tree 1606, particularly near the root 1610. There is a high likelihood that there would be certain levels of granularity (global, countrywide, regional, metropolitan) at which there may be many of the system objects 126. This would require significantly more bits for the Bloom filter and storing data for a level in multiple chunks to avoid reading too much data over and over.

In an illustrative example, examine a system with one trillion of the system objects 126, one billion of the roles 122, and hardware supporting a processing threshold on the order of one thousand of the system objects 126 visible to any one of the agents 116 at a time. This would require approximately one billion of the segments 1602. To have a miss rate of 1%, each of these would require 10 K bits, or 1250 bytes, or 10 terabytes. If there are about 1 kilobytes of storage for each one of the points of interest 106 for recognition and any initial data (or approximately 1 MB/segment), then the system will need approximately 1 petabyte of storage to store the entire system. If the object data is stored in an optimal fashion with only a couple of disk accesses for each one of the segments 1602, then an estimated response time of under 200 milliseconds can be achieved for each megabyte of data that is streamed to the client.

There are two kinds of the trees needed for one of the frames of reference 102 using the global coordinate system 202. The first is the segment tree 1606 of the points of interest 106, where each of the points of interest 106 is roughly at a level corresponding to its visibility range. Each of the nodes 1608 is associated with the Bloom filter 1604 to identify the visibility the roles 122 of the points of interest 106. The agents 116 can enter the system at some GPS coordinate associated with one of the points of interest 106.

The segment tree 1606 can be traversed to determine all of the points of interest 106 to the agents 116. This can include both those having an appropriate visibility one of the roles 122 and those within range. If one of the agents 116 moves and is no longer in the same segment, then it needs to traverse the segment tree 1606 again from the common parent of the old and new ones of the segments 1602 down to its new segment for the points of interest 106. The previous set of the points of interest 106 can be discarded. This will generally be a small number of the segments 1602, but there can be pathological cases in any given segmentation scheme.

Also, depending on where one of the agents 116 is in one of the segments 1602, it may be necessary to traverse multiple paths to ensure everything within a given distance is covered. Alternatively, the points of interest 106 can be placed in all of the segments 1602 that intersect its range, but that may require managing multiple inserts.

Given the likely uneven dispersion of the system objects 126, it can be possible to create a non-uniform segmentation at larger levels, such as ensuring that populated regions all have a common root far down the system, and putting large uninhabited areas together. This can minimize the number of paths that need to be traversed, but that would have its own overhead. Traversing the segment tree 1606 and reading data from disk can be performed in parallel, with the results packaged together the frames of reference 102 transmission to the agents 116.

Figure 17:
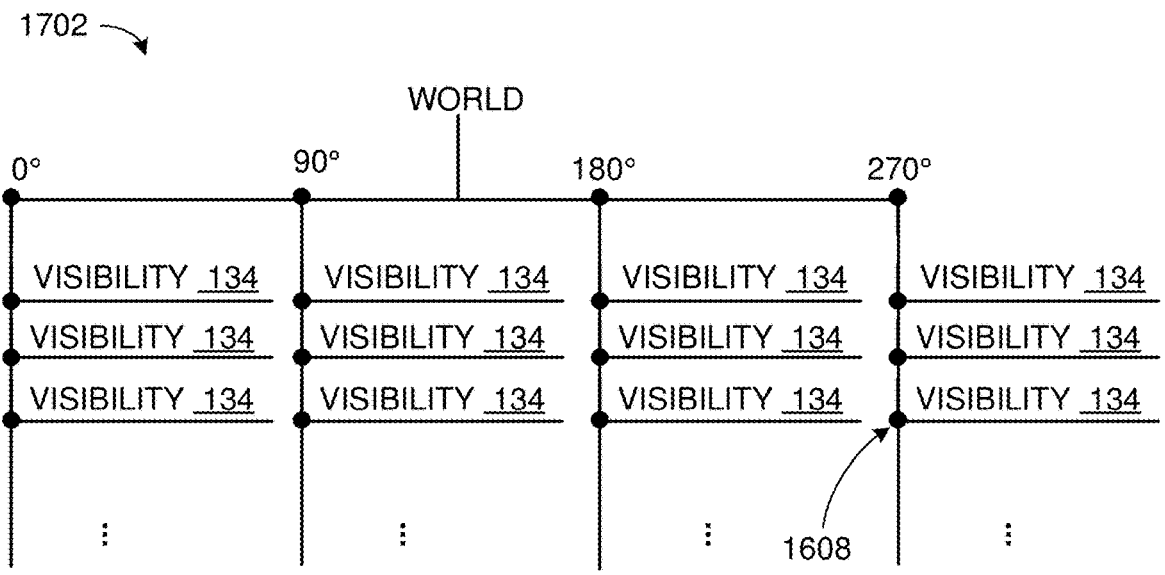
FIG. 17 is an example of a visibility tree.

Referring now to FIG. 17, therein is shown an example of a visibility tree 1702. The visibility tree 1702 can map the visibility 134 of FIG. 1 for the agents 116 of FIG. 1 in the segments 1602 of FIG. 16. The visibility tree 1702 is the second type of tree needed for the frames of reference 102 of FIG. 1 using the global coordinate system 202 of FIG. 2.

The visibility tree 1702 for each of the roles 122 of FIG. 1 can control the visibility 134. The nodes 1608 of the visibility tree 1702 just have lists of the visibility 134 of the agents 116 within that geographic region and their last known positions. When one of the system objects 126 of FIG. 1 is updated or created, then it must inform all users within range. It must traverse the visibility tree 1702 to find the segments 1602 potentially containing users and then check for the actual distance from the agents 116. The constraint on the size of the one of the nodes 1608 is the time it takes to make the necessary comparisons. Even if the agents 116 with the roles 122 controlling the visibility 134 are widely dispersed, there is no point in dividing the root one of the nodes 1608 if there are only a few of them. Again, the visibility tree 1702 for the visibility 134 may be traversed in parallel.

To ensure that updates are not lost, one of the system objects 126 can first insert itself in visibility tree 1702 describing the points of interest 106 of FIG. 1 before traversing the segment tree 1702 describing the roles 122 for the visibility 134. And the agents 116 always update the visibility tree 1702 with the roles 122 before traversing the segment tree 1702 having the points of interest 106. This way it is possible that one of the agents 116 will be told to update one of the system objects 126 even after its read the most recent version, but there won't be a chance for it to pass through the segment tree 1702 having the points of interest 106 before an update and then update the visibility tree 1702 having the roles 122 after the agents 116 have been informed and miss the update.

In an alternative example, suppose one of the system objects 126 is updated and the agents 116 need to be informed. Instead of trying to inform all of the agents 116 in the augmented reality system 100, only the agents 116 having the visibility 134 for that one of the system objects 126 should be informed. The visibility 134 is one of the access rights 120, so the system can restrict the notification only to the agents 116 with that one of the access rights 120 and to the agents 116 who are close enough to view the object.

In the case where only a small number of the agents 116 have the visibility 134 of one of the system objects 126, the system can quickly check the distance from the agents 116 to the system objects 126 and only notify the agents 116 that are close enough to view the system objects 126. In the case where there are thousands or millions of the system objects 126, then the system can use a tree structure that grows and shrinks as the agents 116 with the access rights 120 enter and leave the system. Using a tree structure can reduce the computational power required for doing the search for the access rights 120 for the visibility 134.

When there are few users, the agents 116 can be checked quickly. As the number increases, then the root of the tree can be broken down into children and then successively break the children up as they become more crowded, down to some level where breaking them up would be more expensive then checking them all.

All the agents 116 can be at the leaves of the tree, but one of the system objects 126 looking for the agents 116 enters at the top of the tree, or the local equivalent, and searches the adjacent nodes in parallel to discover the agents 116 that are nearby.

Yet another approach would be to use one tree 1702 for both purposes. The visibility tree 1702 can represent the roles 122 and the points of interest 106. However this is more complex, as the two of the visibility tree 1702 are organized around different principles. It can also increase the number of updates to a single shared structure. The segments 1602 would have an associated set of the roles 122. Now, the agents 116 only exist at the roots of the system, so the presence of the agents 116 could require splits to the visibility tree 1702.

Also, since when an update occurs, it's necessary to find all the users, it's necessary to propagate up the visibility tree 1702 having the roles 122 present in the each subtree, otherwise many of the segments 1602 could be looked at unnecessarily. This strongly increases the number of updates necessary when users move around.

Having the visibility tree 1702 for the roles 122 implies a push architecture, where users need to be updated immediately when there are changes. This makes sense when there is real time interaction. A more "weblike" approach is a pull architecture, where each the agents 116 periodically requests updates from the system. The current state of each of the agents 116 is correct to within the period of the poll. This is adequate in many circumstances.

When the agents 116 poll, the segment tree 1606 is re-traversed and the segments 1602 updated since the last poll are checked. The system can combine both architectures with most the roles 122 being "pull" and the high value ones of the roles 122 being "push". For example, notifications to the agents 116 could be "push".

An alternative to the Bloom filter 1604 of FIG. 16 approach would be using hash tables. However, this would require at least 64 bit identifiers, since $1T > 2^{32}$ as well as extra space for hashing, so storage requirements would be in the range of 200 K or so for each of the segments 1602.

The alternative to all this is to run several independent applications, each taking care of its own set of the system objects 126. This ends up being far more resource intensive and arguably slower for the user. Rather than sending one message to an aggregated service, the agents 116 would need to send messages continuously for each running application, each responding with its own data.

Upon entering a location, several messages would go out and some return. There would be no ability to reuse geometric data about a location to minimize the recognition overhead on the client. Different applications might use different recognition libraries, adding to client overhead. In addition, there is no easy way for the system objects 126 not in the small set of running apps to start communicating with the agents 116 except by using an expensive global communication subsystem with the related overhead for facilitating communicating between all of the applications and all of the agents 116. This can provide connectivity and communication between all elements, but at an appreciable cost.

Figure 18:
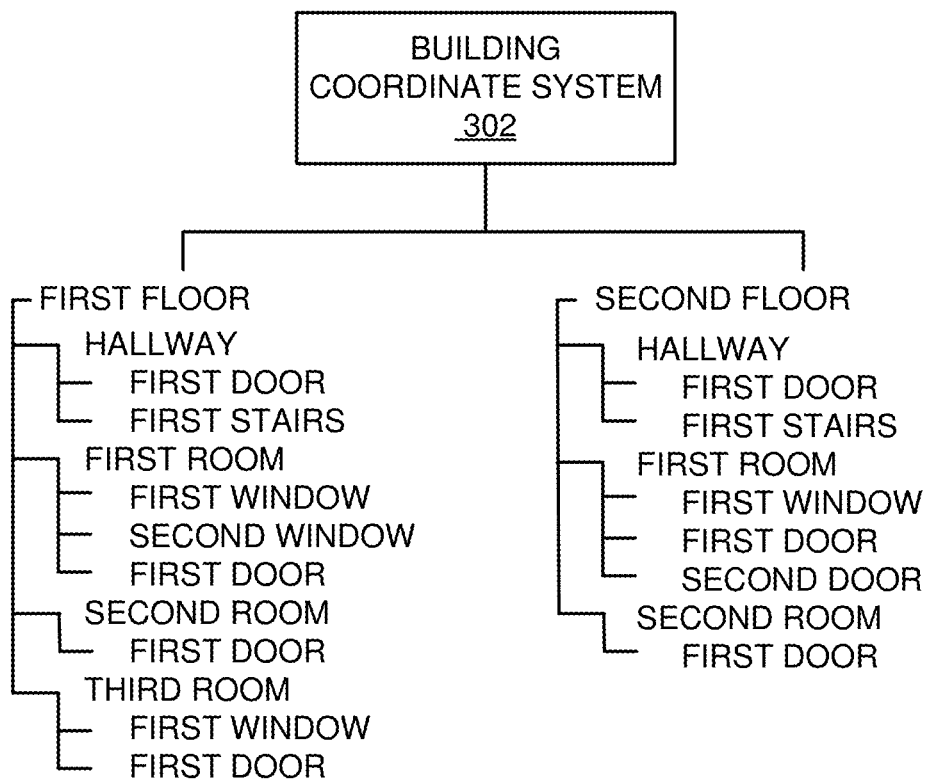
FIG. 18 is an example of the building coordinate system for the frames of reference.

Referring now to FIG. 18, therein is shown an example of the building coordinate system 302 for the frames of reference 102. The building coordinate system 302 can be used to navigation within one of the frames of reference 102 of FIG. 1.

The building can be one of the frames of reference 102 represented by a graph of subspaces representing elements such as floors, rooms, doors, windows, and hallways, the building coordinate system 302 can uniquely identify each of the elements in the building.

For example, the building coordinate system 302 can have a first floor with a first room, a second room, and a third room. The first room can have a first window, a second window, and a first door. The second room can have a first door. The third room can have a first window and a first door. The second floor can have a first room and a second room. The first room can have a first window, a first door, and a second door. The second room can have a first window and a first door.

The building can be entered from some number of points in the global coordinate system or GPS space. For example, the first floor can have a first door that can be the entry point 308 of FIG. 3 for the building.

At any point in time one of the agents 116 of FIG. 1 is in one of the frames of reference 102 for the building. The underlying geometry of one of the frames of reference 102 for the building can understand the graph and has additional information. For example, the additional information can include GPS coordinate information, the vicinity of beacons or Wi-Fi access points, and visual information, such processed images, or SLAM point clouds. In addition, sensors in the real world can track the agents 116 movement through the frame geometry 104 of FIG. 1. These data together can establish where the agents 116 are in the frames of reference 102 of the building and determine the orientation of the agents 116.

Similarly, any of the points of interest 106 in the space can be placed in the frames of reference 102 by putting it in a room and then locking it in place either using coordinates, sensor data, or a combination including SLAM, markers, or other processed visual data. Any of the frames of reference 102 using the building coordinate system 302 can have a multi-level structure, so some of the points of interest 106 of FIG. 1 can be visible in multiple rooms, or on a given floor.

Each of the frames of reference 102 can include a structure containing the full data for one of the frames of reference 102. The structure can include the data for all of the points of interest 106 associated with the various nodes.

In another illustrative example, once one of the agents 116 enters one of the frames of reference 102, it can retrieve the frame geometry 104 information and receives other information to be able to move around within the current one of the frames of reference 102. The type and amount of information depends on the particular implementation.

The agents 116 can be sent a complete description of the geometry at once, or it can be sent data in pieces. At first it would get information for the entry one of the nodes 1608 and its immediate connectivity, and then be sent further information as it moves from one of the nodes 1608 of FIG. 16 to another one of the nodes 1608 in the graph. This would include enough information to understand its position in the space, as well as the points of interest 106 that are immediately visible.

As the agents 116 move around the current one of the frames of reference 102, additional information would be passed to it. If there are updates to one of the system objects 126 of FIG. 1, then all of the agents 116 that are affected can receive a notification. Depending how many of the agents 116 find themselves in the same part of the current one of the frames of reference 102, the augmented reality system 100 of FIG. 1 can simply look for all of the agents 116 at the affected node, or use a one of the roles 122 of FIG. 1 to one of the nodes 1608 mapping and then send the notification to each of the agents 116.

As described, each one of the nodes 1608, such as a representation of a room in a building, functions independently, so only the system objects 126 in the current room are visible at any time. Alternatively, another one of the frames of reference 102 can implement a more advanced geometry would have a more complete understanding of the physical geometry, so that more of the points of interest 106 can be visible if they were actually in the line of sight of the agents 116, even if in another room and only visible through a window.

Figure 19:
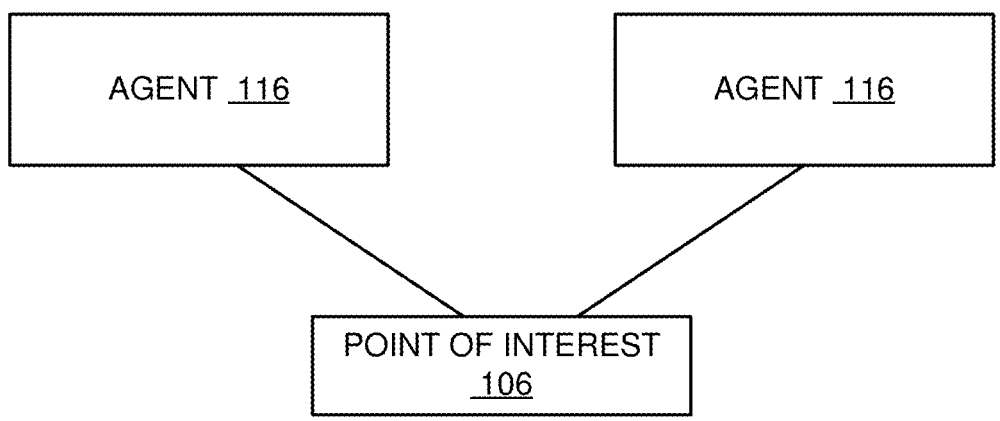
FIG. 19 is an exemplary diagram of the agents cooperating with one another.

Referring now to FIG. 19, therein is shown an exemplary diagram of the agents 116 cooperating with one another. The agents 116 can cooperate with one another to perform actions within the augmented reality system 100 of FIG. 1.

The agents 116 can interact with one another because the agents 116 can also be one of the points of interest 106 of FIG. 1. The augmented reality system 100 can coordinate behavior among groups of the system objects 126 of FIG. 1 that are moving, such as the agents 116. For example, consider a rideshare application such as Uber™ or Lyft™. Each of the taxis can be the points of interest 106 and can be associated with the items 110 of FIG. 1 in one of the frames of reference 102 using the global coordinate system 202. When someone wants a taxi, the one of the agents 116 can be assigned one of the roles 122 of FIG. 1 that lets it perceive the taxis and also becomes one of the items 110 that the taxis can see. The agents 116 are now aware of all the taxis in their vicinity and taxis are aware of all the agents 116 looking for rides.

In another example, the agents 116 can negotiate a price for a transaction using the items 110. One of the agents 116 for the passenger can update itself with the desired destination and an offered price. The points of interest 106 representing the taxis can each create another one of the items 110, such as a ride bid, to propose their own price for the trip. The passenger can then accept the desired ride bid and lock in the transaction with the taxi with the best price. In a related example, the agents 116 of multiple passengers could make their taxi requests available to other passenger and negotiate shared rides.

Figure 20:
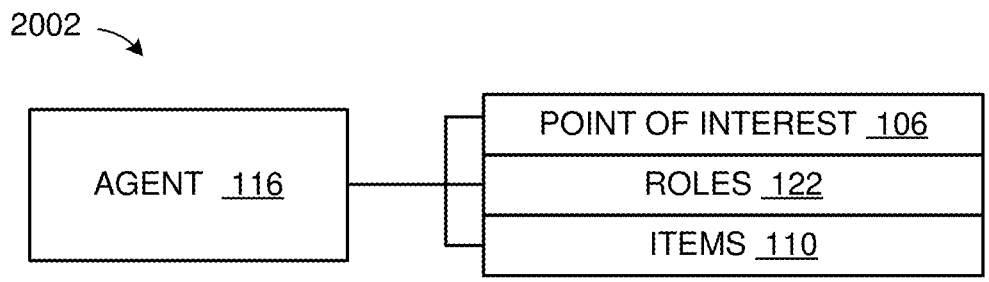
FIG. 20 is an example of an agent data structure.

Referring now to FIG. 20, therein is shown an example of an agent data structure 2002. The agent data structure 2002 of FIG. 20 can represent the agents 116 in the augmented reality system 100 of FIG. 1.

To represent the agents 116 within the augmented reality system 100, the data structure representing the agents 116 can indicate a relationship with the points of interest 106 where the agents are near and the roles 122 of FIG. 1 that may be associated with the agents 116. Although the data structure is shown for a single one of the agents 116, it is understood that multiples of the agents 116 can be represented using a larger data structure, such as an array, a list, a data store, or other similar data structure.

The agents 116 can be associated with one or more of the points of interest 106. Being associated with one of the points of interest 106 allows the agents 116 to interact with each of the points of interest 106 and the system objects 126 of FIG. 1 associated with the points of interest 106.

The agents 116 can also be associated with one or more of the roles 122. Being associated with one of the roles 122 allows the agents 116 to have the access rights 120 of FIG. 1 and the token sets 1202 associated with the roles 122. The access rights 120 and the token sets 1202 of FIG. 12 can control the way the agents 116 can interact with the system objects 126 associated with the points of interest 106.

The agents 116 can also be associated with one or more of the items 110. Being associated with one of the items 110 allows the agents 116 to have the access rights 120 of FIG. 1 and the token sets 1202 associated with the items 110. The access rights 120 and the token sets 1202 of FIG. 12 can control the way the agents 116 can interact with the system objects 126 associated with the points of interest 106. The items 110 can be associated with scripts that execute locally. Local behavior and activity allows the distribution of intelligence across the augmented reality system 100 to make more efficient use of the available computing resources.

In an illustrative example, one of the points of interest 106 can be positioned in a location with one of the items 110 that can track the number of customers that pass that location. Because the items 110 can include script or other code objects that can execute locally, the items 110 can provide functionality such as incrementing a counter when another one of the system objects 126 come within a detection radius. The items 110 can function in a manner similar to one of the agents 116 in that is can be aware of the system objects 126 moving within the augmented reality system 100. The scripts or other code object executing this functionality for the items 110 or the agents 116 can reside in the augmented reality system 100 or on external systems as necessary.

In another illustrative example, the agents 116 can be associated with one of the roles 122 that controls the visibility 134 of FIG. 1 of the message 114 of FIG. 1 associated with one of the points of interest 106. When one of the agents 116 is in one of the frames of reference 102 of FIG. 1 and near the particular one of the points of interest 106, then the agents 116 can have access to the particular one of the message 114 where the access rights 120 grant the visibility 134 to the particular one of the roles 122.

Figure 21:
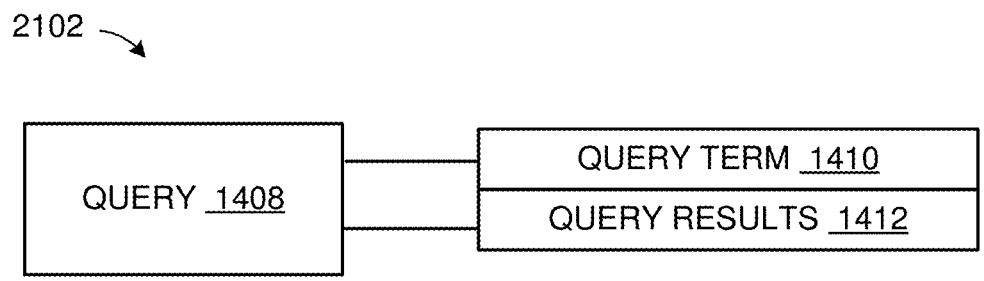
FIG. 21 is an example of a query data structure.

Referring now to FIG. 21, therein is shown an example of a query data structure 2102. The query data structure 2102 can implement the execution of the query 1408.

The augmented reality system 100 of FIG. 1 can support querying to search the system objects 126 within the system. Querying is an integral part of interaction on the current Web and can also be an important part of the augmented world. Much more than the online world, querying in the augmented one is affected by where one queries and who is querying.

For example, the augmented reality system 100 can execute the query 1408 using the query data structure 2102. The query 1408 search operation that can return a list of the system objects 126 related to the query term 1410. The query term 1410 can include words, text, objects, and images associated with the system objects 126 to make them searchable. The query result 1412 is the list of the system objects 126 that match the query term 1410.

The augmented reality system 100 can execute the query 1408 based on a particular set of the frames of reference 102 of FIG. 1 and based on the access rights 120 of FIG. 1, such as the visibility 134 of FIG. 1. For example, one of the agents 116 of FIG. 1 can perform the query 1408 using the query term 1410 having a bookstore frame of reference, the visibility set to all books in the fiction section of the store, and a text search string of "Title: Sherlock Holmes and Author: Doyle". The augmented reality system 100 can return the set of the system objects 126 associated with books that match the search criteria.

The returned set of the system objects 126 may also be associated with a location in one of the frames of reference 102 and some visibility rights based on the location of the agents 116, but using one of the frames of reference 102 and visibility rights to boost corresponding results ensures that nearby, accessible ones of the system objects 126 will sort near the top of the returned items. Where visibility rights are associated with a found object, they must be filtered by the rights of the requester. In addition, location information can be used to filter out results by distance, or to present them to the agents 116 as part of the search results.

Search points out another type of the frames of reference 102, one which is only accessible within another, but which is not part of the outer one of the frames of reference 102. For example, if one of the agents 116 is in a bookstore and queries on a book cover, then the one of the agents 116 in the current one of the frames of reference 102 can help narrow the search to book covers. One of the agents 116 for this search might return one of frames of reference 102 with bookstore employee comments that can only be perceived from inside the bookstore.

Figure 22:
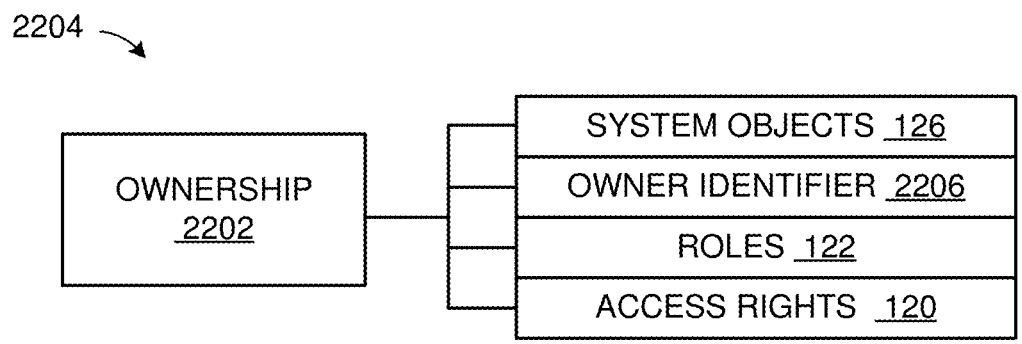
FIG. 22 is an example of an ownership data structure.

Referring now to FIG. 22, therein is shown an example of an ownership data structure 2204. The ownership data structure 2204 can describe ownership 2202 regarding an owner identifier 2206 for one or more of the system objects 126 within the augmented reality system 100 of FIG. 1.

The augmented reality system 100 can specify the ownership 2202 of assets, such as the system objects 126 by associating the owner identifier 2206 to the system objects 126. The owner identifier 2206 is a system level identifier to show which entity controls fundamental access to one of the system objects 126. For example, the owner identifier 2206 can include the agents 116 of FIG. 1, a user identification, an external system identifier, or a combination thereof.

The ownership 2202 is necessary to control access and to support billing whoever pays for the operation of the augmented reality system 100. Billing and ownership are intimately related to the allocation of the access rights 120. For example, the ownership 2202 can be used to determine who can grant access to one of the system objects 126 in one of the token sets 1202 of FIG. 12. If another one of the agents 116 accesses one of the system objects 126, then the augmented reality system 100 can record the usage and send a billing message to one of the agents 116.

The ownership 2202 can be implemented in a variety of ways. For example, the ownership can be associated with the access rights 120 and the roles 122. The ownership 2202 can address the visibility 134 of FIG. 1 right, but also the access rights 120 such as creating a new one of the frames of reference 102 within an existing one of the frames of reference 102 of FIG. 1, or adding the points of interest 106 of FIG. 1 or the items 110 of FIG. 1 into the system. As with other aspects of access control, these can be supported by the system itself or offloaded to the owner.

In an illustrative example, one of the agents 116 playing a game can be billed for access to one of the frames of reference 102 representing the building where the game is played. Granting access to the items 110 in the game can also be billed. This allows for billing when the user finds and takes "the sword of power" within the game.

Figure 23:
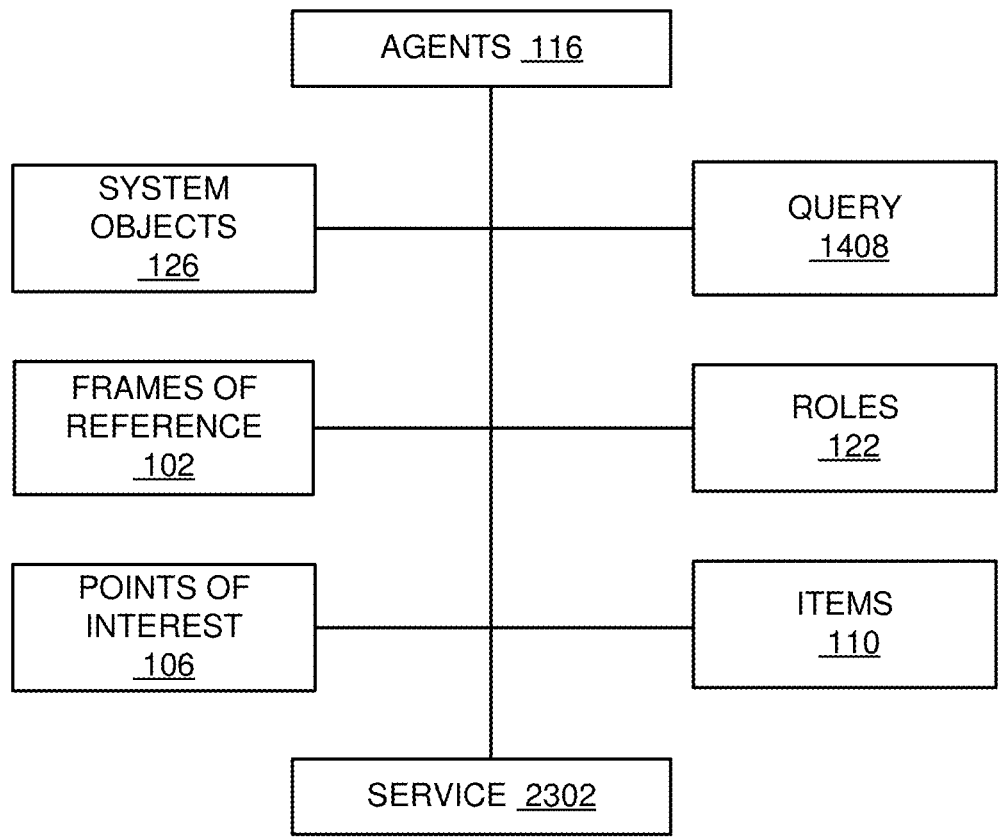
FIG. 23 is an example of the agent actions.

Referring now to FIG. 23, therein is shown an example of the agent actions. The agents 116 can operate on the frames of reference 102, the points of interest 106, the items 110, and others of the system objects 126.

The agents 116 can perform a variety of actions in the system. One of the agents can announce its location with regards to one or more of the coordinate systems. One of the agents 116 can enter or leave one of the frames of reference 102. One of the agents 116 can create one of the system objects 126, such as one of the points of interest 106, one of the frames of reference 102, one of the items 110, or a combination thereof.

One of the agents 116 can execute the query 1408 having the query term 1410 of FIG. 14. One of the agents 116 can duplicate one or more of the system objects 126 in the system. This allows for the personalization of the system objects 126 in some location. For example, everyone sees the same initial version, but each person interacts with their own particular version with no necessary overlap. The duplicates may have persistence, or may not. If not, they may reside entirely locally and not interact with the server.

One of the agents 116 can update the system objects 126. This can include operations such as update, delete, edit, move, re-root, add to an overlapping coordinate system, or a combination thereof.

One of the agents 116 can take temporary possession of one of the items 110. While the augmented reality system 100 of FIG. 1 can serve as an augmented reality server, it is not expected to continuous service real-time interaction with the system objects 126. These operations should be mostly handled by the owner and the agents 116. The agents 116 can take temporary ownership of some of the points of interest 106 and manage them within the system for a period of time. This can occur when the server stops conveying information about one of the points of interest 106.

This can also occur when the server encounters a problem taking possession of one of the points of interest 106. The owner of the agents 116 or points of interest 106 can provides a URL or other information for where to get further information about the points of interest 106, as well, as a volume in the appropriate coordinate systems where the points of interest 106 might be found.

For example, in an augmented reality game, the points of interest 106 could be a magic talisman on a table. Once someone picks it up, they take possession. Anyone else who might perceive the talisman would need to communicate with the augmented reality game system for further information. The server would only convey that it could be in the area. When the agents 116 returns the object to its original place, then the server may regain possession and indicate a consistent location. Alternatively, the agents 116 might transfer the object to its local frame and put it in its inventory.

One of the agents 116 can add or remove one of the roles 122. This can require having the appropriate identity to create the roles 122 and attach them to one of the system objects 126.

In an illustrative example, the augmented reality system 100 can provide an underlying "Location as a Service" feature as part of normal operation. The display portion of the augmented reality system 100 is an example of one kind of application that needs location as a service. The location as a service can provide the location of the system objects 126 as needed.

The agents 116 can interoperate with a service 2302 providing access to the system objects 126. The service 2302 can be the underlying hardware systems used to implement a portion of the augmented reality system 100. The service 2302 can act as a repository of the system objects 126 that is both global in scope and universal in application. The service 2302 can be application agnostic and interoperate with any of the internal and external systems that need to interact with the system objects 126. For example, the system objects 126 in any application can be thought of as having a location that can be provided by the service 2302. The system objects 126 can be indexed by location in one of the frames of reference 102 according to the frame geometry 104 and associated by a set of the access rights 120. The system objects 126 can be stored in the same repository for multiple kinds of the frame geometry 104.

Searching the service 2302 can be optimized over the different types of the system objects 126. The agents 116 can send requests to the service 2302 for objects. This may be on-demand or periodically. Further, the service 2302 can be configured to periodically send results for a particular request automatically. The requests can specify some set of locations in the frames of reference with parameters such as keywords and radii, etc. The requests can indicate the current physical location of one of the agents 116 in the frames of reference 102, but not always. A person in New York City can request about the system objects 126 in Los Angeles to display results in a map.

The services 2302 can return a list of the system objects 126 with some associated content. The list can only include data that one of the agents 116 has permission to receive. The content can include additional information providing some indication of how the agents 116 can use the content. For example, some of the content may include information on how to precisely locate one of the points of interest 106 and also provide other information to enhance the display when it is in the visual field of the viewing unit 118. Other content can include a Waze® notice for cars to slow down as near a known speed trap. The content can include repair records for refrigerator, access to a web services API for the soda machine, the name of an application to activate, or other information to help use the content.

The agents 116 are system objects 126, so this can be a symmetric relationship. The system objects 126 can respond to the movements of the agents 116.

The service 2302 can support an open-ended set of use cases and provide information about the system objects 126 as necessary. The access control can enable the growth of the service 2302, because not all of the system objects 126 can reside on a single instance of the service 2302. Different instances of the service 2302 can interoperate and share the system objects 126. Having explicit access control means that the system objects 126 can support the creation of new services that can be built on top as mashups by sharing objects.

Figure 24:
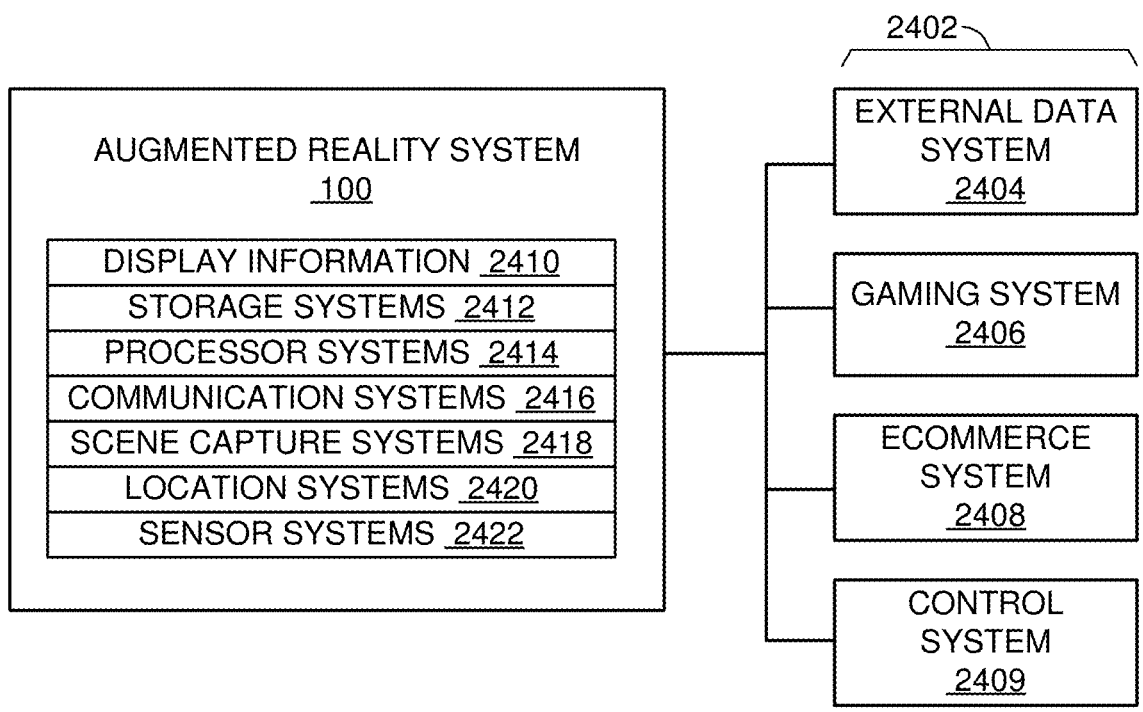
FIG. 24 is an example of related systems.

Referring now to FIG. 24, therein is shown an example of related systems 2402. The augmented reality system 100 can interact with the related systems 2402 to provide information on the behavior and status of some of the system objects 126 of FIG. 1.

The augmented reality system 100 can be implemented in a centralized or distributed configuration. For example, the augmented reality system 100 can be implemented in a cloud computing environment, a centralized data center, an array of portable computing devices, in a virtual computing environment, or a combination thereof.

The augmented reality system 100 can be configured with a variety of internal and external systems. The augmented reality system 100 can include storage systems 2412, processor systems 2414, communication systems 2416, scene capture systems 2418, location systems 2420, and sensor systems 2422. The systems can be coupled to one another with logical data connections including network links, optical links, wireless links, direct connections, bus connections, remote connections, or a combination thereof.

The storage systems 2412 can store data and executable code for the augmented reality system 100. The storage systems 2412 can include memory units for active computing and large scale persistent storage. The storage systems 2412 can be distributed or localized. The storage systems 2412 can support the migration of data among units of the storage systems 2412 for load balancing, speed of local access, geographical priority, or a combination thereof. For example, the storage systems 2412 can include cloud storage, hard disk storage, solid state memory units, optical memory units, redundant storage units, tape storage units, or a combination thereof.

The processor systems 2414 can implement the augmented reality system 100 by executing code (not shown) on one or more processing units. The processor system 2414 can be distributed or local. The processor systems 2414 can include cloud computing servers, dedicated servers, multi-processors, arrays of computing elements, smart phones, smart glasses, tablet computers, notebook computers, desktop computers, other viewing devices, or a combination thereof.

The communication systems 2416 can link the systems of the augmented reality system 100 together internally and externally. The communication systems 2416 can include wired network links, wireless network links, bus links, direct connections, optical communication links, matrix communication links, or a combination thereof.

The scene capture systems 2418 are devices for receiving information about the physical world and creating data-based representations for use in the augmented reality system 100. The scene capture systems 2418 can be local or distributed. The scene capture systems 2418 can include image sensors, magnetic sensors, optical sensors, infrared sensors, ultraviolet sensors, proximity sensors, contact sensors, or a combination thereof. The information from the scene capture systems 2418 can be digitized and stored in the storage systems 2412 for distribution via the communication systems 2416 to the agents 116 of FIG. 1 for display on the viewing units 118 of FIG. 1. The information from the scene capture systems 2418 can be used to determine and store the physical location 148 of FIG. 1 of the system objects 126. The scene capture systems 2418 can include the integration of scene capture information from internal and external scene capture mechanisms.

The location systems 2420 are devices for establishing and enhancing location information associated with the scene capture system 2418 and the system objects 126. The location systems 2420 can include radiolocation systems, direct location feeds, scene matching systems, pattern matching systems, three-dimensional geometry systems, correlation systems, physical modeling systems, matching systems, or a combination thereof. For example, the location systems 2420 can include systems for resolving fine grained locations of the system objects 126 based on the surface features of the systems objects 126 as detected within a scene. The location systems 2420 can include systems for creating 3D models of scenes to extract edge and corner locations, global positioning systems, beacon-based location systems, registration systems, or a combination thereof.

The sensor systems 2422 are devices for measuring physical information for the augmented reality system 100. The sensor systems 2422 can be distributed or local. The sensor systems 2422 can include pressure sensors, temperature sensors, magnetic field sensors, chemical sensors, touch sensors, audio sensors, olfactory sensors, taste sensors, radiation sensors, mechanical sensors, optical sensors, event counters, or a combination thereof. The information from the sensor system 2422 can be conveyed to the agents 116 as enhanced display information to be presented to the user to enhance the experience of the augmented reality system 100. For example, the chemical sensor information from a warehouse fumes detector can be conveyed to one of the agents 116 and automatically displayed as a message 114 warning of a chlorine smell associated with one of the points of interest 106 of FIG. 1.

In an illustrative example, the augmented reality system 100 can performed continuous monitoring of the sensor system 2422 and have one of the agents 116 react appropriately based on detection of certain conditions. For example, the sensor system 2422 can be an event counter detecting the number of people who enter an event facility room. If the number of people exceeds a predefined threshold, such as a maximum occupancy, then the agent 116 can respond and present a warning or by directly preventing further entry by controlling an entry turnstile. The agents 116 can interact directly with other external control systems and control mechanisms to perform actions in the real world, such as controlling the turnstiles, sounding an alarm, activating a valve, changing the lighting, or other actions.

The augmented reality system 100 can be coupled to the related systems 2402 to access information on the related systems 2402. For example, the related systems 2402 can include an external data system 2404, a gaming system 2406, an ecommerce system 2408, a control system 2409, or a similar external system.

For example, the augmented reality system 100 can be coupled to the ecommerce system 2408 when one of the agents 116 of FIG. 1 enters a store in a mall. The ecommerce system 2408 can provide real-time pricing and inventory information to help support a sale.

In another example, the augmented reality system 100 can be coupled to the gaming system 2406 when one of the agents 116 accesses a game. The gaming system 2406 can provide detailed access to the information about the game including artwork, gaming rules, game interaction, communication with gaming characters, or similar gaming information.

In yet another example, the augmented reality system 100 can be coupled to the external data system 2404 to receive enhanced display information 2410. The display information 2410 can be supplemental data to render the system objects 126 with better clarity, resolution, and detail. The external data system 2404 can include an imaging unit to provide more detailed graphics for the system objects 126 in the augmented reality system 100. The external data system 2404 could provide detailed images of the artwork in a museum during an augmented reality tour.

In a further example, the augmented reality system 100 can be coupled to the control system 2409 to perform actions on external devices, such as a control mechanism. For example, the control system 2409 can be a turnstile control system for a concert venue, a building air conditioning system, a chemical warning system in a warehouse, a water distribution system for a farm, or a similar external system for controlling devices in the physical world. The control mechanism can be a system controller, a value controller, internal settings, input devices, or a combination thereof. The augmented reality system 100 can receive and send information to the control system 2409.

The augmented reality system 100 can be distinguished from the gaming context because of the open nature of reality. Virtual reality systems and games take place inside closed worlds where everything is known to software executing somewhere. In virtual reality systems all the geometry is known and maintained by the system. All the system objects 126, and their properties and physics are known by the system.

Virtual reality system elements such as surfaces are clearly defined and the system is aware when something is attached to the surface. The system knows what the relevant physics are, and nothing changes without the explicit knowledge of the virtual reality system. Visibility in the virtual reality system is easily calculated because of the perfect knowledge of the system.

However, in the augmented reality system 100, knowledge of the frame geometry 104 of FIG. 1 can be limited to the sensors and processing power of the devices. It is not a priori evident what is a wall, how far it is from the agents 116, and, therefore, whether one of the points of interest 106 is necessarily visible.

It has been discovered that the performance of the augmented reality system 100 improved by being coupled with the sensors 138 of FIG. 1 in the real world to define the system objects 126 in one of the frames of reference 102 of FIG. 1. Motion in the augmented reality system 100 is directly linked to motion and the frame geometry 104 of the real world.

Another issue is determining which of the points of interest 106 are close enough to one the agents 116 for the agents 116 to be aware of the points of interest 106 of FIG. 1. Processing limitations show that none of the agents 116 can handle being given a list of all of the points of interest 106 in the augmented reality system 100. Because the augmented reality system 100 can have billions of the system objects 126, even sending the necessary data to locate them a burdensome task. The performance problem is also demonstrated when there are millions of the points of interest 106 that could individually change over time. Therefore the agents 116 needs to be sent a limited set of the points of interest 106 that it might encounter before it actually sees them to prevent an unacceptable delay or lag.

The augmented reality system 100 is different from gaming systems. In an illustrative gaming example, the points of interest 106 that are local are fixed to the immediate geometry of the game, which is known in advance and maintained by the game system. In addition, all the users in the game are in known locations and move to known locations within the system. Further, in a virtual reality game, motion in the real world does not correlate with motion in the game.

In the augmented reality system 100 example, the agents 116 may not have the frame geometry 104 of the whole world. A particular space or region only becomes interesting when one of the points of interest 106 is created. The information about the new area can be received on demand and does not have to be pre-defined or pre-cached.

Existing augmented reality toolkits are starting to look beyond simple marker-based points of interest 106 to consider at least local geometry and are implementing 3D techniques such as SLAM. However these efforts remain localized to a single application. The system described here can work with such toolkits by supporting a global repository for the system objects 126 orthogonal to the browser implementation.

Figure 25:
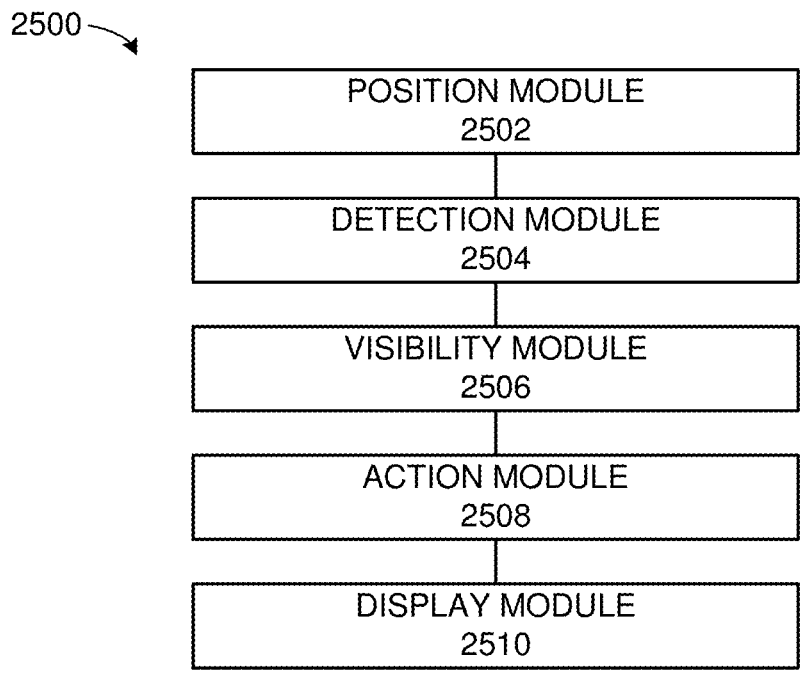
FIG. 25 is an example of a process flow of operation of the augmented reality system.

Referring now to FIG. 25, therein is shown an example of a process flow of operation of the augmented reality system 2500. The augmented reality system 2500 can operate by displaying images of the real world overlaid with the representations of the system objects 126 of FIG. 1.

The augmented reality system 100 can be configured in a variety of ways. For example, the augmented reality system 100 can include a position module 2502, a detection module 2504, a visibility module 2506, an action module 2508, and a display module 2510.

The position module 2502 can determine the real world position and orientation of the viewing unit 118 of FIG. 1 associated with one of the agents 116 of FIG. 1. The position module 2502 can calculate the current location 144 of FIG. 1 and the current orientation 146 of FIG. 1 of the viewing unit 118 using the position sensor 140 of FIG. 1 and the orientation sensor 142 of FIG. 1.

One of the agents 116 can be implemented as software (not shown) executing on the viewing unit 118 or associated with the viewing unit 118. The current location 144 and the current orientation 146 can be calculated at one time on a continuous basis and updated as needed by the agents 116.

The detection module 2504 can determine which of the system objects 126 are near the agents 116. The detection module 2504 can correlate the current location 144 and the current orientation 146 in relation to the system objects 126. For example, the detection module 2504 can determine the current one of the frames of reference 102 of FIG. 1 for one of the agents 116. Then the detection module 2504 can determine the presence of the system objects 126, such as the points of interest 106 of FIG. 1, the items 110 of FIG. 1, the message 114 of FIG. 1, or a combination thereof, that are within the detection threshold 150 of FIG. 1 of the current location 144 and have the persistence 136 of FIG. 1 to exist at the current time 154 of FIG. 1.

In an illustrative example, the detection module 2504 can determine the location and orientation of the agents 116 and then operate on the agents 116. First, the detection module 2504 can periodically send the location and orientation information to the server implementing the augmented reality system 100, which can respond with a possibly empty list of interesting objects and updates, which can be locally stored in an information repository. The server can check the persistence 136 and the visibility 134 of the system objects 126 to determine a set of the system objects 126 that the agents 116 are likely to encounter. For example, it might send all the system objects 126 in a room. Caching the system objects 126 that are nearby can improve performance, especially when the user is moving.

Second, the detection module 2504 can check the local repository to determine what to display at a particular moment, based on the location, orientation, the visibility 134, and the persistence 136 associated with the system objects 126.

The visibility module 2506 can determine which of the system object 126 have the visibility 134 of FIG. 1 to be perceived by one of the agents 116 based on the current location 144 and the current orientation 146 of the system objects 126 for viewing by the viewing unit 118. The visibility 134 can be based on the roles 122 of FIG. 1, the token sets 1202, and the access rights 120 associated with the agents 116 and the system objects 126. For example, one of the agents 116 can read the message 114 if they are associated with the access rights 120 to allow them to read the message 114.

The action module 2508 can perform operations on the system objects 126 in the augmented reality system 100. The action module 2508 can determine if the agents 116 can perform an operation or modify the object state 152 of the system objects 126 based on the roles 122, the token sets 1202 of FIG. 1, and the access rights 120 of FIG. 1 associated with the agents 116 and the system objects 126. For example, one of the agents 116 can create the message 114 if they have the access rights 120 to allow creation of the message 114. In another example, one of the agents 116 can retrieve one of the system objects 126 representing the "sword of power" if they have the access rights 120 for playing the game.

The display module 2510 can display the information from the augmented reality system 100 as an overlay to the imagery of the real world. The display module 2510 can control the viewing unit 118 to display the system objects 126 in the proper location and orientation relative to the real world based on the current location 144, the current orientation 146, the object location 128 of FIG. 1, and the object orientation 130 of FIG. 1. The display module 2510 can update the viewing unit 118 on a one time or continuous basis. After completion of the display module 2510, the control flow can pass back to the position module 2502.

It has been discovered that displaying the system objects 126 in the viewing unit 118 based on the visibility 134 and the persistence 136 of the system objects 126 increases the functionality of the augmented reality system 100. Displaying the information in the viewing unit 118 enables the user to interact with information and manipulate the system objects 126.

Figure 26:
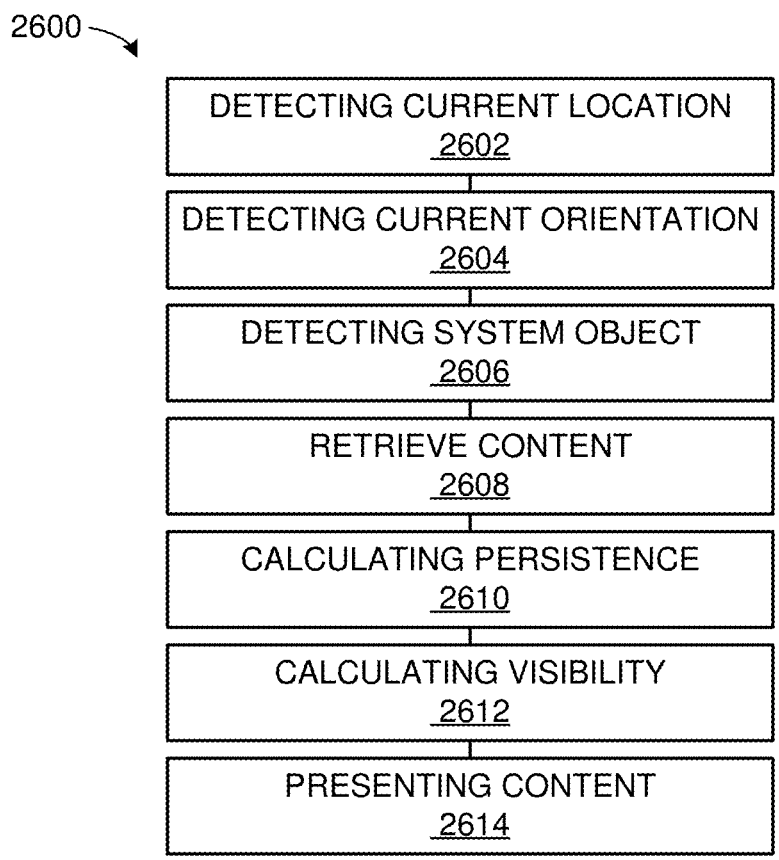
FIG. 26 is a flow chart of a method of operation of an augmented reality system in a further embodiment of the present invention.

Referring now to FIG. 26, therein is shown a flow chart of a method 2600 of operation of an augmented reality system in a further embodiment of the present invention. The method 2600 includes: detecting a current location in a block 2602; detecting a current orientation in a block 2604; detecting a system object having an object location within a detection threshold of the current location in a block 2606; retrieving a content associated with the system object in a block 2608; calculating a persistence of the system object based on the current time and a persistence extent in a block 2610; calculating a visibility of the system object based on an access right and the object location in a block 2612; and presenting the content of the system object to a control mechanism based on the persistence and the visibility in a block 2614.

Thus, it has been discovered that the augmented reality system of the present invention furnishes important and heretofore unknown and unavailable solutions, capabilities, and functional aspects for an augmented reality system. The resulting method, process, apparatus, device, product, and/or system is straightforward, cost-effective, uncomplicated, highly versatile and effective, can be surprisingly and unobviously implemented by adapting known technologies, and are thus readily suited for efficiently and economically manufacturing the augmented reality systems fully compatible with conventional manufacturing methods or processes and technologies.

Another important aspect of the present invention is that it valuably supports and services the historical trend of reducing costs, simplifying manufacturing, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation for an augmented reality system comprising:

entering a second frame of reference at an entry point at a first current location in a first frame of reference in a field of view of an agent;

detecting a system object in the second frame of reference, the system object having an access right permission matching another access right permission of the agent;

sending a message to an external system coupled to the system object;

receiving a content from the external system in response to the message;

calculating a persistence of the system object based on a current time and a persistence extent;

extracting a visibility of the system object from a visibility tree, the visibility tree having the visibility of the system object pre-defined and linked to anode associated to a second current location in the second frame of reference containing the system object; and displaying the content over a real-world image on the agent based on the persistence of the system object and the visibility.

2. The method as claimed in claim 1 wherein extracting the visibility of the system object includes updating the visibility of the system object in the visibility tree based on the content received from the external system.

3. The method as claimed in claim 1 wherein detecting the system object includes:

returning a query result based on a query term in the second frame of reference, the query result having at least one system object related to the query term; and selecting the system object in the query result, the system object having an access right permission matching another access right permission of the agent.

4. The method as claimed in claim 1 wherein sending the message includes sending the message to a control mechanism of a control system for performing an action in the control system.

5. The method as claimed in claim 1 wherein sending the message includes sending the message to an external data system having an imaging unit to provide images with improved clarity, resolution, and detail and based on the first current location.

6. The method as claimed in claim 1 wherein sending the message includes sending the message to an ecommerce system and receiving real-time pricing and inventory information based on the system object.

7. The method as claimed in claim 1 wherein sending the message includes sending the message to a gaming system and receiving the content having a game communication with one or more gaming characters.

8. An augmented reality system comprising:

a position sensor for calculating a second frame of reference at an entry point at a first current location in a first frame of reference in a field of view of an agent;

a communication unit, coupled to the position sensor, for detecting a system object in the second frame of reference, the system object having an access right permission matching another access right permission of the agent, for sending a message to an external system coupled to the system object, and for receiving a content from the external system in response to the message;

a control mechanism, coupled to the communication unit, for calculating a persistence of the system object based on a current time and a persistence extent, for extracting the visibility of the system object from a visibility tree linked to a node associated to a second current location in the second frame of reference containing the system object; and a display unit, coupled to the control mechanism, for displaying the content over a real-world image on the agent based on the persistence of the system object and the visibility.

9. The system as claimed in claim 8 wherein the communication unit is for updating the visibility of the system object in the visibility tree based on the content received from the external system.

10. The system as claimed in claim 8 wherein the communication unit is for returning a query result based on a query term in the second frame of reference, the query result having at least one system object related to the query term and selecting the system object in the query result, the system object having an access right permission matching another access right permission of the agent.

11. The system as claimed in claim 8 wherein the communication unit is for sending the message to a control mechanism of a control system for performing an action in the control system.

12. The system as claimed in claim 8 wherein the communication unit is for sending the message to an external data system having an imaging unit to provide images with improved clarity, resolution, and detail and based on the first current location.

13. The system as claimed in claim 8 wherein the communication unit is for sending the message to an ecommerce system and receiving real-time pricing and inventory information based on the system object.

14. The system as claimed in claim 8 wherein the communication unit is for sending the message to a gaming system and receiving the content having a game communication with one or more gaming characters.

15. One or more non-transitory computer-readable media storing instructions that, when executed by one or more computing devices, cause:

entering a second frame of reference at an entry point at a first current location in a first frame of reference in a field of view of an agent;

detecting a system object in the second frame of reference, the system object having an access right permission matching another access right permission of the agent;

sending a message to an external system coupled to the system object;

receiving a content from the external system in response to the message;

calculating a persistence of the system object based on a current time and a persistence extent;

extracting a visibility of the system object from a visibility tree, the visibility tree having the visibility of the system object pre-defined and linked to a node linked to a second current location in the second frame of reference containing the system object; and displaying the content over a real-world image on the agent based on the persistence of the system object and the visibility.

16. The non-transitory computer-readable media of claim 15, wherein the instruction when executed by the one or more computing devices, further cause receiving the content includes updating the visibility of the system object in the visibility tree based on the content received from the external system.

17. The non-transitory computer-readable media of claim 15, wherein the instructions when executed by the one or more computing devices, further cause returning a query result based on a query term in the second frame of reference, the query result having at least one system object related to the query term and selecting the system object in the query result, the system object having an access right permission matching another access right permission of the agent.

18. The non-transitory computer-readable media of claim 15, wherein the instructions when executed by the one or more computing devices, further cause sending the message to a control mechanism of a control system for performing an action in the control system.

19. The non-transitory computer-readable media of claim 15, wherein the instructions when executed by the one or more computing devices, further cause sending the message to an external data system having an imaging unit to provide images with improved clarity, resolution, and detail and based on the first current location.

20. The non-transitory computer-readable media of claim 15, wherein the instructions when executed by the one or more computing devices, further cause sending the message to an ecommerce system and receiving real-time pricing and inventory information based on the system object.

\* \* \* \* \*

UNITED STATES PATENT AND TRADEMARK OFFICE
CERTIFICATE OF CORRECTION

| | |
|---|---|
| PATENT NO. | : 11,633,667 B2 |
| APPLICATION NO. | : 17/903941 |
| DATED | : April 25, 2023 |
| INVENTOR(S) | : Matthew Daniel Fuchs |

It is certified that error appears in the above-identified patent and that said Letters Patent is hereby corrected as shown below:

In the Claims

Column 41
Claim 1: Line 16: Delete "anode" and insert --a node--

Signed and Sealed this
Twenty-third Day of May, 2023

Katherine Kelly Vidal
*Director of the United States Patent and Trademark Office*